(12) United States Patent
Jayaraman

(10) Patent No.: US 12,450,387 B2
(45) Date of Patent: Oct. 21, 2025

(54) CHAT SUPPORT PLATFORM WITH USER-ENABLED VIRTUAL CHAT COMMUNICATION SESSION SECURITY SETTINGS FOR REDACTING PERSONALLY IDENTIFIABLE INFORMATION

(71) Applicant: Truist Bank, Charlotte, NC (US)

(72) Inventor: Barath Jayaraman, Charlotte, NC (US)

(73) Assignee: Truist Bank, Charlotte, NC (US)

( * ) Notice: Subject to any disclaimer, the term of this patent is extended or adjusted under 35 U.S.C. 154(b) by 227 days.

(21) Appl. No.: 18/180,772

(22) Filed: Mar. 8, 2023

(65) Prior Publication Data
US 2024/0303371 A1 Sep. 12, 2024

(51) Int. Cl.
*G06F 21/62* (2013.01)
*G06Q 30/015* (2023.01)

(52) U.S. Cl.
CPC ....... *G06F 21/6245* (2013.01); *G06Q 30/015* (2023.01)

(58) Field of Classification Search
CPC .......................... G06F 21/6245; G06Q 30/015
See application file for complete search history.

(56) References Cited

U.S. PATENT DOCUMENTS

| | | | |
|---|---|---|---|
| 2004/0260770 A1* | 12/2004 | Medlin | H04L 12/1813 709/204 |
| 2006/0075228 A1* | 4/2006 | Black | H04L 63/104 713/167 |
| 2008/0002911 A1* | 1/2008 | Eisen | H04N 1/4486 382/283 |
| 2008/0052759 A1* | 2/2008 | Kronlund | G06F 21/6209 726/2 |
| 2009/0144619 A1* | 6/2009 | Best | G06F 21/6245 715/277 |
| 2012/0239540 A1* | 9/2012 | Rogers, Jr. | G06F 21/6245 726/26 |
| 2013/0110946 A1* | 5/2013 | Bradshaw | H04L 12/6418 709/206 |
| 2014/0108241 A1* | 4/2014 | Tunnell | G06Q 20/321 705/41 |
| 2017/0104756 A1* | 4/2017 | Rosenthal | H04L 63/20 |
| 2017/0269575 A1* | 9/2017 | Halperin | G06F 30/00 |
| 2020/0258172 A1* | 8/2020 | Gibbon | G06F 16/2428 |
| 2021/0343126 A1* | 11/2021 | Drako | G08B 13/19686 |
| 2023/0113338 A1* | 4/2023 | Buddhiraju | G06F 21/604 726/27 |
| 2024/0086469 A1* | 3/2024 | Jayaraman | G06F 16/94 |
| 2024/0303371 A1* | 9/2024 | Jayaraman | G06Q 30/015 |

* cited by examiner

*Primary Examiner* — Catherine Thiaw
*Assistant Examiner* — Nega Woldemariam
(74) *Attorney, Agent, or Firm* — Jordan IP Law, LLC; Michael A. Springs, Esq.

(57) ABSTRACT

A computing device, a computer program product, and a computer-implemented method for delivering enhanced financial services and, more particularly, for facilitating enhanced communication between a user and a financial institution via a client device. A digital financial management platform for the client device includes a chat support platform that facilitates a redaction of sensitive, proprietary, and/or protected information of the user during a virtual chat communication session.

15 Claims, 15 Drawing Sheets

CHAT SUPPORT PLATFORM WITH USER-ENABLED VIRTUAL CHAT COMMUNICATION SESSION SECURITY SETTINGS FOR REDACTING PERSONALLY IDENTIFIABLE INFORMATION

TECHNICAL FIELD

The present disclosure relates to a computing device, computer program product, and computer-implemented method for delivering digital financial services and, more particularly, for a chat support platform that facilitates user-enabled virtual chat communication session security settings that facilitate the redaction of sensitive, proprietary, and/or protected information of the user during a virtual chat communication session.

BACKGROUND

Financial institutions that provide financial services are increasingly providing a greater number of client services. In order to alleviate call and chat density from customers over a network environment, such client services include automated virtual support agents (e.g., chatbots) who supplement human virtual support agents by directly interacting with customers via text chat, phone, instant messaging, etc.

SUMMARY

The present disclosure relates to a computing device, a computer program product, and a computer-implemented method for delivering enhanced digital financial services over a communication network by providing a digital financial management platform for a client device that includes a virtual chat communication platform that facilitates virtual chat communication sessions with the ability for a user to customize, contemporaneously with a virtual chat communication session, security settings for the virtual chat communication session in a manner that facilitates the redaction of sensitive, proprietary, and/or protected information of the user during a virtual chat communication session. The sensitive, proprietary, and/or protected information includes, but is not limited to, the personally identifiable information (PII) of the user.

In accordance with one or more embodiments set forth, illustrated, and described herein, an apparatus may comprise one or more of the following: one or more processors; and a non-transitory memory coupled to the one or more processors, the non-transitory memory including a set of instructions of computer-executable program code, which when executed by the one or more processors, cause the apparatus to: cause, during execution of a mobile application or desktop application associated with a financial institution by a client device of a user over a communication network, a visual display of a chat interface on the client device to facilitate a virtual chat communication session between the user and a virtual support agent of the financial institution; receive, from the client device contemporaneously with the virtual chat communication session, a command to redact personally identifiable information (PII) of the user; continue the virtual chat communication session and determine a message from the support agent for the virtual chat communication session; in response to the command, implement a redaction of the personally identifiable information (PII) from the message into a redacted message; and cause the redacted message to be displayed in the virtual chat communication session on the graphical user interface of the client device.

In accordance with one or more embodiments set forth, illustrated, and described herein, an apparatus may comprise one or more of the following: one or more processors; and a non-transitory memory coupled to the one or more processors, the non-transitory memory including a set of instructions of computer-executable program code, which when executed by the one or more processors, cause the apparatus to: cause, during execution of a mobile application or desktop application associated with a financial institution by a client device of a user over a communication network, a visual display of a chat interface on the client device to facilitate a virtual chat communication session between the user and a virtual support agent of the financial institution; receive, from the client device contemporaneously with the virtual chat communication session, a command to set current security settings as a default; continue the virtual chat communication session and determine a message from the support agent for the virtual chat communication session; implement a redaction of the personally identifiable information (PII) from the message into a redacted message using the current security settings, and cause the redacted message to be displayed in the virtual chat communication session on the graphical user interface of the client device, wherein the current security settings are set as default security settings for future virtual chat communication sessions based on the command.

In accordance with one or more embodiments set forth, illustrated, and described herein, an apparatus may comprise one or more of the following: one or more processors; and a non-transitory memory coupled to the one or more processors, the non-transitory memory including a set of instructions of computer-executable program code, which when executed by the one or more processors, cause the apparatus to: cause, during execution of a mobile application or desktop application associated with a financial institution by a client device of a user over a communication network, a visual display of a chat interface on the client device to facilitate a virtual chat communication session between the user and a virtual support agent of the financial institution; receive, from the client device contemporaneously with the virtual chat communication session, a command to redact personally identifiable information (PII) of the user; generate, in response to the command and contemporaneously with the virtual chat communication session, a reply message; identify personally identifiable information (PII) in the reply message; redact the identified personally identifiable information (PII) in the reply message; and cause, contemporaneously with the virtual chat communication session, a visual display of the redacted reply message on the graphical user interface of the client device.

In accordance with each respective apparatus, the set of instructions, which when executed by the one or more processors, enables the apparatus such that the command is a text string entered in a chat box in the virtual chat communication session on the client device.

In accordance with each respective apparatus, the set of instructions, which when executed by the one or more processors, enables the apparatus such that the personally identifiable information (PII) comprises a social security number and a financial account number of the user.

In accordance with each respective apparatus, the set of instructions, which when executed by the one or more processors, causes the redaction of the personally identifiable information (PII) to remove all characters of PII from the message.

In accordance with each respective apparatus, the set of instructions, which when executed by the one or more processors, causes the redaction of the personally identifiable information (PII) to remove some but not all characters of personally identifiable information (PII) from the message.

In accordance with each respective apparatus, the set of instructions, which when executed by the one or more processors, enables the command to specify only particular types of PII that will be redacted.

In accordance with each respective apparatus, the set of instructions, which when executed by the one or more processors, enables the user to set current security settings as default settings for future virtual chat communication sessions contemporaneously with a current virtual chat communication session.

In accordance with one or more embodiments set forth, illustrated, and described herein, a computer program product comprising a computer program product comprising at least one non-transitory computer readable medium having with a set of instructions of computer-executable program code, which when executed by one or more processors of a computing device, cause the computing device to: cause, during execution of a mobile application or desktop application associated with a financial institution by a client device of a user over a communication network, a visual display of a chat interface on the client device to facilitate a virtual chat communication session between the user and a virtual support agent of the financial institution; receive, from the client device contemporaneously with the virtual chat communication session, a command to redact personally identifiable information (PII) of the user; continue the virtual chat communication session and determine a message from the support agent for the virtual chat communication session; in response to the command, implement a redaction of the personally identifiable information (PII) from the message into a redacted message; and cause the redacted message to be displayed in the virtual chat communication session on the client device.

In accordance with one or more embodiments set forth, illustrated, and described herein, a computer program product comprising a computer program product comprising at least one non-transitory computer readable medium having with a set of instructions of computer-executable program code, which when executed by one or more processors of a computing device, cause the computing device to: cause, during execution of a mobile application or desktop application associated with a financial institution by a client device of a user over a communication network, a visual display of a chat interface on the client device to facilitate a virtual chat communication session between the user and a virtual support agent of the financial institution; receive, from the client device contemporaneously with a virtual chat communication session, a command to set current security settings as a default; continue the virtual chat communication session and determine a message from the support agent for the virtual chat communication session; implement a redaction of the PII from the message into a redacted message based on the current security settings; and cause the redacted message to be displayed in the virtual chat communication session on the client device, wherein the current security settings are set as default security settings for future virtual chat communication sessions based on the command.

In accordance with one or more embodiments set forth, illustrated, and described herein, a computer program product comprising a computer program product comprising at least one non-transitory computer readable medium having with a set of instructions of computer-executable program code, which when executed by one or more processors of a computing device, cause the computing device to: cause, during execution of a mobile application or desktop application associated with a financial institution by a client device of a user over a communication network, a visual display of a chat interface on the client device to facilitate a virtual chat communication session between the user and a virtual support agent of the financial institution; receive, from the client device contemporaneously with the virtual chat communication session, a command to redact PII of the user; generate, in response to the command and contemporaneously with the virtual chat communication session, a reply message; identify PII in the reply message; redact the identified PII in the reply message; and cause, contemporaneously with the virtual chat communication session, a visual display of the redacted reply message on the graphical user interface of the client device.

In accordance with each respective computer program product, wherein the set of instructions, which when executed by the one or more processors, enable the computing device to recognize the command as a text string entered in a chat box in the virtual chat communication session on the client device.

In accordance with each respective computer program product, wherein, the set of instructions, which when executed by the one or more processors, enables the computing device to recognize that the PII comprises a social security number and a financial account number of the user.

In accordance with each respective computer program product, wherein the set of instructions, which when executed by the one or more processors, causes the redaction of the personally identifiable information (PII) to remove all characters of personally identifiable information (PII) from the message.

In accordance with each respective computer program product, wherein the set of instructions, which when executed by the one or more processors, causes the redaction of the PII to remove some but not all characters of personally identifiable information (PII) from the message.

In accordance with each respective computer program product, wherein the set of instructions, which when executed by the one or more processors, enables the command to specify only particular types of personally identifiable information (PII) that will be redacted.

In accordance with each respective computer program product, wherein the set of instructions, which when executed by the one or more processors, enables current security settings to be set as a default setting for future virtual chat communication sessions.

In accordance with one or more embodiments set forth, illustrated, and described herein, a computer-implemented method may comprise one or more of the following: causing, by one or more financial institution servers associated with a financial institution during execution of a mobile application or desktop application associated with the financial institution by a client device of a user over a communication network, a visual display of a chat interface on the client device to facilitate a virtual chat communication session between the user and a first virtual support agent of the financial institution; receiving, by the one or more financial institution servers from the client device contemporaneously with the virtual chat communication session, a command to redact personally identifiable information (PII) of the user; continuing, by the one or more financial institution servers associated, the virtual chat communication session and determining a message from a support agent for the virtual chat communication session; in response to the command, implementing, by the one or more financial institution servers, a redaction of the personally identifiable information (PII) from the message into a redacted message; and causing, by the one or more financial institution servers, the redacted message to be displayed in the virtual chat communication session displayed on the graphical user interface of the client device.

In accordance with one or more embodiments set forth, illustrated, and described herein, a computer-implemented method may comprise one or more of the following: causing, by one or more financial institution servers associated with a financial institution during execution of a mobile application or desktop application associated with the financial institution by a client device of a user over a communication network, a visual display of a chat interface on the client device to facilitate a virtual chat communication session between the user and a first virtual support agent of the financial institution; receiving, by the one or more financial institution servers from the client device contemporaneously with the virtual chat communication session, a command to set current security settings as a default; continuing, by the one or more financial institution servers, the virtual chat communication session and determining a message from a support agent for the virtual chat communication session; implementing, by the one or more financial institution servers, a redaction of personally identifiable information (PII) from the message into a redacted message based on current security settings; and causing, by the one or more financial institution servers, the redacted message to be displayed in the virtual chat communication session displayed on the graphical user interface of the client device, wherein the current security settings are set as default security settings for future virtual chat communication sessions based on the command.

In accordance with one or more embodiments set forth, illustrated, and described herein, a computer-implemented method may comprise one or more of the following: causing, by one or more financial institution servers associated with a financial institution during execution of a mobile application or desktop application associated with the financial institution by a client device of a user over a communication network, a visual display of a chat interface on the client device to facilitate a virtual chat communication session between the user and a first virtual support agent of the financial institution; receiving, by the one or more financial institution servers from the client device contemporaneously with the virtual chat communication session, a command to redact PII of the user; generating, by the one or more financial institution servers in response to the command and contemporaneously with the virtual chat communication session, a reply message; identifying, by the one or more financial institution servers, personally identifiable information (PII) in the reply message; redact, by the one or more financial institution servers the identified personally identifiable information (PII) in the reply message; and causing, by the one or more financial institution servers contemporaneously with the virtual chat communication session, a visual display of the redacted reply message on the graphical user interface of the client device.

In accordance with each respective computer-implemented method, the set of instructions, which when executed by the one or more processors, enables the command to specify only particular types of personally identifiable information (PII) that will be redacted.

In accordance with each respective computer-implemented method, the set of instructions, which when executed by the one or more processors, enables current security settings to be set as a default setting for future virtual chat communication sessions.

In accordance with each respective computer-implemented method, further comprising, recognizing the command as a text string entered in a chat box in the virtual chat communication session on the client device.

In accordance with each respective computer-implemented method, the personally identifiable information (PII) comprising a social security number and a financial account number of the user.

In accordance with each respective computer-implemented method, wherein the redaction of the personally identifiable information (PII) removes all characters of personally identifiable information (PII) from the message.

In accordance with each respective computer-implemented method, further comprising enabling the command to specify only particular types of personally identifiable information (PII) that will be redacted.

In accordance with each respective computer-implemented method, further comprising, enabling a further command to set current security settings as a default setting for future virtual chat communication sessions.

DRAWINGS

The various advantages of the exemplary embodiments will become apparent to one skilled in the art by reading the following specification and appended claims, and by referencing the following drawings, in which:

DESCRIPTION

Figure 1:
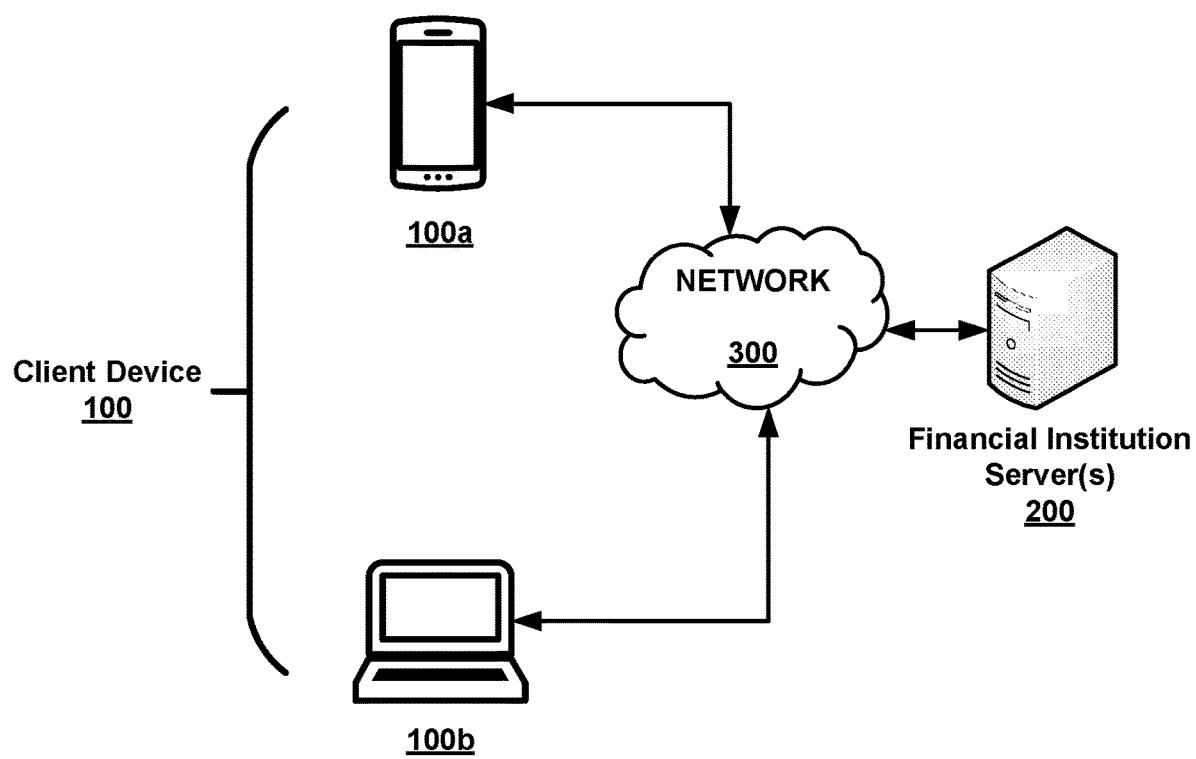
FIG. 1 illustrates a communication environment, in accordance with one or more embodiments set forth and described herein.

Hereinbelow are example definitions that are provided only for illustrative purposes in this disclosure, and should not be construed to limit the scope of the one or more embodiments disclosed herein in any manner. Some terms are defined below for purposes of clarity. These terms are not rigidly restricted to these definitions. This disclosure contemplates that these terms and other terms may also be defined by their use in the context of this description.

As used herein, "application" relates to software used on a computer (usually by a client and/or client device and can be applications that are targeted or supported by specific classes of machine, such as a mobile application, desktop application, tablet application, and/or enterprise application (e.g., client device application(s) on a client device). Applications may be separated into applications which reside on a client device (e.g., VPN, PowerPoint, Excel) and cloud applications which may reside in the cloud (e.g., Gmail, GitHub). Cloud applications may correspond to applications on the client device or may be other types such as social media applications (e.g., Facebook).

As used herein, "artificial intelligence (AI)" relates to one or more computer system operable to perform one or more tasks that normally require human intelligence, such as visual perception, speech recognition, decision-making, and translation between languages.

As used herein, "machine learning" relates to an application of AI that provides computer systems the ability to automatically learn and improve from data and experience without being explicitly programmed.

As used herein, "computer" relates to a single computer or to a system of interacting computers. A computer is a combination of a hardware system, a software operating system and perhaps one or more software application programs. Examples of a computer include without limitation a personal computer (PC), laptop computer, a smart phone, a cell phone, or a wireless tablet.

As used herein, "client device" relates to any device associated with a user, including personal computers, laptops, tablets, and/or mobile smartphones.

As used herein, "modules" relates to either software modules (e.g., code embodied on a machine-readable medium or in a transmission signal) or hardware modules. Certain embodiments are described herein as including logic or a number of components, modules, or mechanisms. A "hardware module" (or just "hardware") as used herein is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein. In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as an FPGA or an ASIC. A hardware module may also include programmable logic or circuitry that is temporarily configured by software to perform certain operations. A hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations. Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time. Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access.

As used herein, "network" or "networks" relates to any combination of electronic communication networks, including without limitation the Internet, a local area network (LAN), a wide area network, a wireless network, and a cellular network (e.g., 4G, 5G).

As used herein, "processes" or "methods" are presented in terms of processes (or methods) or symbolic representations of operations on data stored as bits or binary digital signals within a machine memory (e.g., a computer memory). These processes or symbolic representations are examples of techniques used by those of ordinary skill in the data processing arts to convey the substance of their work to others skilled in the art. As used herein, a "process" is a self-consistent sequence of operations or similar processing leading to a desired result. In this context, processes and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information.

As used herein, "processor-Implemented module" relates to a hardware module implemented using one or more processors. The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein.

As used herein, "server" relates to a server computer or group of computers that acts to provide a service for a certain function or access to a network resource. A server may be a physical server, a hosted server in a virtual environment, or software code executing on a platform.

As used herein, "service" or "application" relates to an online server (or set of servers), and can refer to a web site and/or web application.

As used herein, "software" relates to a set of instructions and associated documentations that tells a computer what to do or how to perform a task. Software includes all different software programs on a computer, such as applications and the operating system. A software application could be written in substantially any suitable programming language, which could easily be selected by one of ordinary skill in the art. The programming language chosen should be compatible with the computer by which the software application is to be executed and, in particular, with the operating system of that computer. Examples of suitable programming languages include without limitation Object Pascal, C, C++, CGI, Java, and Java Scripts. Further, the functions of some embodiments, when described as a series of steps for a method, could be implemented as a series of software instructions for being operated by a processor, such that the embodiments could be implemented as software, hardware, or a combination thereof.

As used herein, "sensor" relates to any device, component and/or system that can perform one or more of detecting, determining, assessing, monitoring, measuring, quantifying, and sensing something.

As used herein, "real-time" relates to a level of processing responsiveness that a user, module, or system senses as sufficiently immediate for a particular process or determination to be made, or that enables the processor to keep up with some external process.

As used herein, "user" relates to a consumer, machine entity, and/or requesting party, and may be human or machine.

In accordance with one or more embodiments set forth, illustrated, and described herein, a virtual chat communication platform is provided for a client device of a user having one or more financial accounts residing at one or more financial institution servers of a financial institution. The virtual chat communication platform enables a single user, using a single client device, to participate in multiple simultaneous virtual chat communication sessions with virtual support agents acting on behalf of the financial institution in support of serving the needs of the user. In that way, the user is not forced to cancel or end a first virtual chat communication session in order to commence two or more additional virtual chat communication sessions using the same client device.

Turning to the figures, in which FIG. 1 illustrates a communication environment that facilitates communications between a user and a financial institution. A client device 100 of a user (financial account holder) operating in the communication environment facilitates user access to and user management of one or more financial accounts residing at one or more financial institution servers 200 of the financial institution. The communication environment includes the client device 100, the one or more financial institution servers 200, and a communication network 300 through which communication is facilitated between the client device 100 and the one or more financial institution servers 200.

In accordance with one or more embodiments set forth, described, and/or illustrated herein, the client device 100 comprises a computing device, including but not limited to a desktop computer, a laptop computer, a smart phone, a handheld personal computer, a workstation, a game console, a cellular phone, a mobile device, a personal computing device, a wearable electronic device, a smartwatch, smart eyewear, a tablet computer, a convertible tablet computer, or any other electronic, microelectronic, or micro-electromechanical device for processing and communicating data. This disclosure contemplates the client device 100 comprising any form of electronic device that optimizes or otherwise transforms the performance and functionality of the one or more embodiments in a manner that falls within the spirit and scope of the principles of this disclosure.

Figure 2:
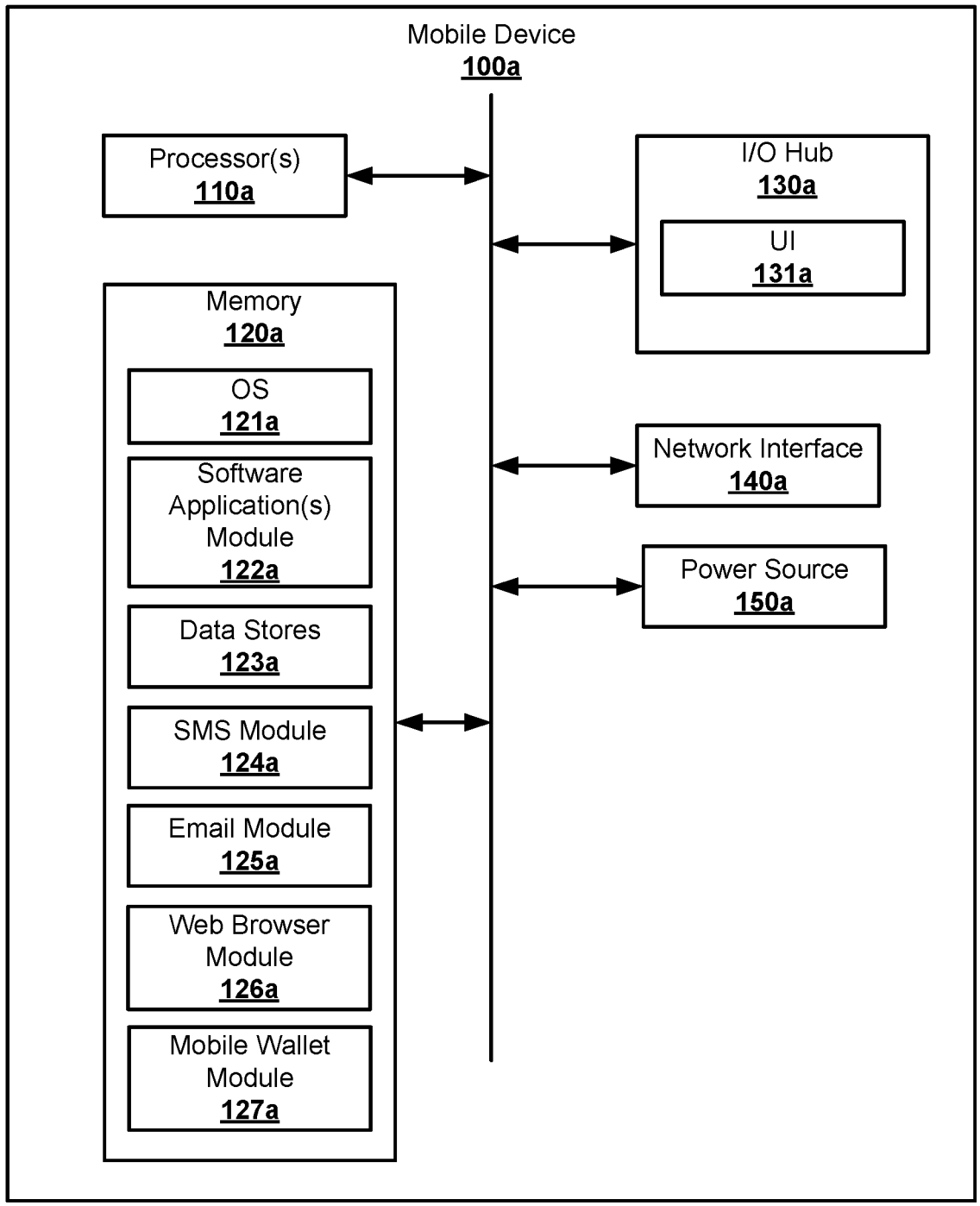
FIG. 2 illustrates a block diagram of the first client device of FIG. 1.

In the illustrated example embodiment of FIG. 2, the client device 100 comprises a mobile device 100*a*. Some of the possible operational elements of the mobile device 100*a* are illustrated in FIG. 2 and will now be described herein. It will be understood that it is not necessary for the mobile device 100*a* to have all the elements illustrated in FIG. 2. For example, the mobile device 100*a* may have any combination of the various elements illustrated in FIG. 2. Moreover, the mobile device 100*a* may have additional elements to those illustrated in FIG. 2.

The mobile device 100*a* includes one or more processors 110*a*, a non-transitory memory 120*a* operatively coupled to the one or more processors 110a, an I/O hub 130a, a network interface 140a, and a power source 150a.

The memory 120a comprises a set of instructions of computer-executable program code. The set of instructions are executable by the one or more processors 110a to cause execution of an operating system 121a and one or more software applications of a software application module 122a that reside in the memory 120a. The one or more software applications residing in the memory 120a includes, but is not limited to, a financial institution application that is associated with the financial institution. The financial institution application comprises a mobile application or desktop application that facilitates establishment of a secure connection between the mobile device 100a and the one or more financial institution servers 200. The one or more processors 110a are operable to execute the mobile application or desktop application to facilitate user access to the one or more financial accounts and user management of the one or more financial accounts.

The memory 120a also includes one or more data stores 123a that are operable to store one or more types of data. The mobile device 100a may include one or more interfaces that facilitate one or more systems or modules thereof to transform, manage, retrieve, modify, add, or delete, the data residing in the data stores 123a. The one or more data stores 123a may comprise volatile and/or non-volatile memory. Examples of suitable data stores 123a include, but are not limited to RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable non-transitory storage medium, or any combination thereof. The one or more data stores 123a may be a component of the one or more processors 110a or alternatively, may be operatively connected to the one or more processors 110a for use thereby. As set forth, described, and/or illustrated herein, "operatively connected" may include direct or indirect connections, including connections without direct physical contact.

The memory 120a also includes an SMS module 124a operable to facilitate user transmission and receipt of text messages via the mobile device 100a though the network 300. In one example embodiment, the user may receive text messages from the financial institution that are associated with the user access and the user management of the one or more financial accounts. An email module 125a is operable to facilitate user transmission and receipt of email messages via the mobile device 100a through the network 300. In one example embodiment, the user may receive email messages from the financial institution that are associated with the user access and the user management of the one or more financial accounts. The user may utilize a web browser module 126a that is operable to facilitate user access to one or more websites associated with the financial institution through the network 300. A digital wallet module 127a facilitates the generation of one or more digital wallets associated with the one or more financial accounts.

In accordance with one or more embodiments set forth, described, and/or illustrated herein, the mobile device 100a includes an I/O hub 130a operatively connected to other systems and subsystems of the mobile device 100a. The I/O system 130a may include one or more of an input interface, an output interface, and a network controller to facilitate communications between the mobile device 100a and the one or more financial institution servers 200. The input interface and the output interface may be integrated as a single, unitary user interface 131a, or alternatively, be separate as independent interfaces that are operatively connected.

As used herein, the input interface is defined as any device, software, component, system, element, or arrangement or groups thereof that enable information and/or data to be entered as input commands by a user in a manner that directs the one or more processors 110a to execute instructions. The input interface may comprise a user interface (UI), a graphical user interface (GUI), such as, for example, a display, human-machine interface (HMI), or the like. Embodiments, however, are not limited thereto, and thus, this disclosure contemplates the input interface comprising a keypad, touch screen, multi-touch screen, button, joystick, mouse, trackball, microphone and/or combinations thereof.

As used herein, the output interface is defined as any device, software, component, system, element or arrangement or groups thereof that enable information/data to be presented to a user. The output interface may comprise one or more of a visual display or an audio display, including, but not limited to, a microphone, earphone, and/or speaker. One or more components of the mobile device 100a may serve as both a component of the input interface and a component of the output interface.

The mobile device 100a also includes a network interface 140a operable to facilitate connection to the network 300. The mobile device 100a further includes a power source 150a that comprises a wired powered source, a wireless power source, a replaceable battery source, or a rechargeable battery source.

Figure 3:
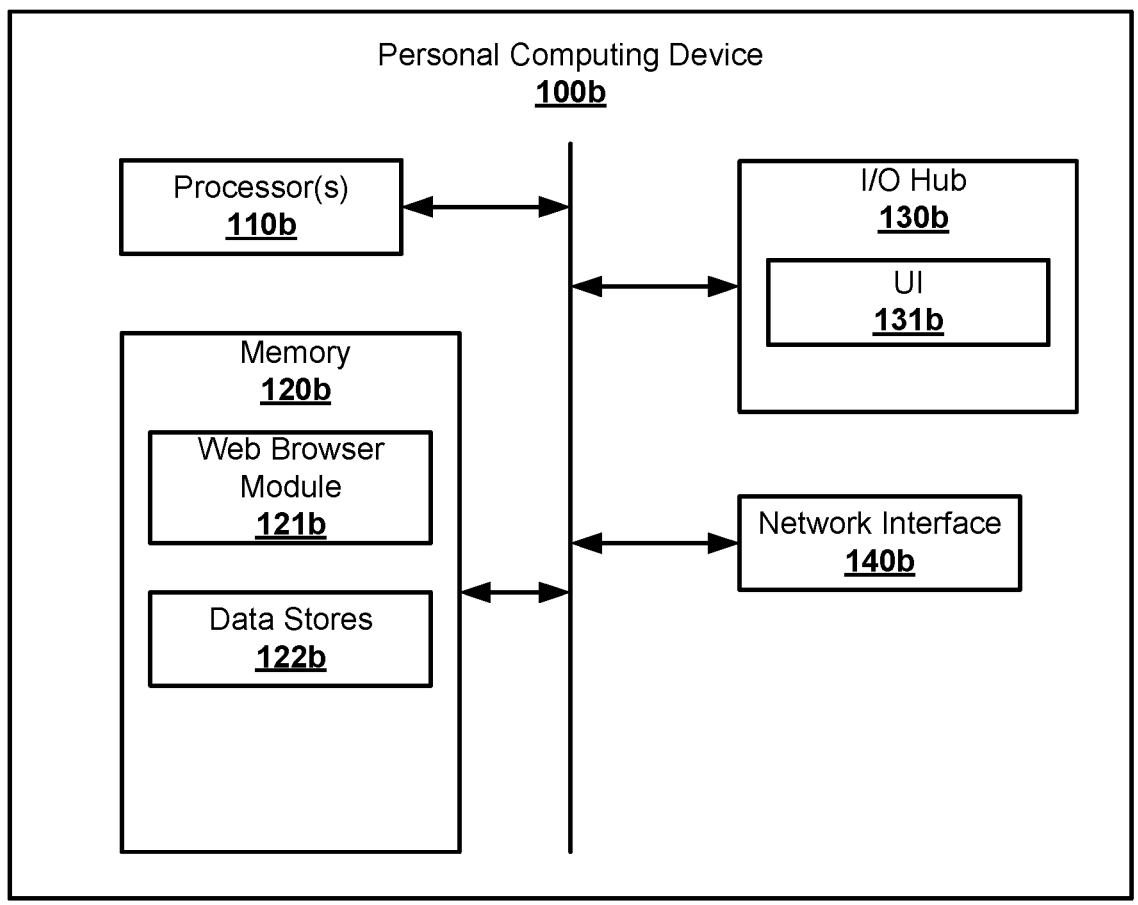
FIG. 3 illustrates a block diagram of the second client device of FIG. 1.

In the illustrated example embodiment of FIG. 3, the client device 100 comprises a personal computing device 100b. Some of the possible operational elements of the personal computing device 100b are illustrated in FIG. 3 and will now be described herein. It will be understood that it is not necessary for the personal computing device 100b to have all the elements illustrated in FIG. 3. For example, the personal computing device 100b may have any combination of the various elements illustrated in FIG. 3. Moreover, the personal computing device 100b may have additional elements to those illustrated in FIG. 3.

The personal computing device 100b includes one or more processors 110b, a non-transitory memory 120b operatively coupled to the one or more processors 110A, an I/O hub 130b, and a network interface 140b.

The memory 120b comprises a set of instructions of computer-executable program code. The set of instructions are executable by the one or more processors 110b to cause control of the web browser module 121b in a manner that facilitates user access to a web browser having one or more websites associated with the financial institution through the network 300.

The memory 120b also includes one or more data stores 122b that are operable to store one or more types of data. The personal computing device 100b may include one or more interfaces that facilitate one or more systems or modules thereof to transform, manage, retrieve, modify, add, or delete, the data residing in the data stores 122b. The one or more data stores 122b may comprise volatile and/or non-volatile memory. Examples of suitable data stores 122b include, but are not limited to RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable non-transitory storage medium, or any combination thereof. The one or more data stores 122b may be a component of the one or more processors 110b, or alternatively, may be operatively connected to the one or more processors 110b for use thereby. As set forth, described, and/or illustrated herein, "operatively connected" may include direct or indirect connections, including connections without direct physical contact.

In accordance with one or more embodiments set forth, described, and/or illustrated herein, "processor" means any component or group of components that are operable to execute any of the processes described herein or any form of instructions to carry out such processes or cause such processes to be performed. The one or more processors 100b may be implemented with one or more general-purpose and/or one or more special-purpose processors. Examples of suitable processors include graphics processors, microprocessors, microcontrollers, DSP processors, and other circuitry that may execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The one or more processors 110b may comprise at least one hardware circuit (e.g., an integrated circuit) operable to carry out instructions contained in program code. In embodiments in which there is a plurality of processors, such processors may work independently from each other, or one or more processors may work in combination with each other.

In accordance with one or more embodiments set forth, described, and/or illustrated herein, the personal computing device 100a includes an I/O hub 130b operatively connected to other systems and subsystems of the personal computing device 100a. The I/O system 130b may include one or more of an input interface, an output interface, and a network controller to facilitate communications between the personal computing device 100a and the one or more financial institution servers 200. The input interface and the output interface may be integrated as a single, unitary user interface 131b, or alternatively, be separate as independent interfaces that are operatively connected.

As used herein, the input interface is defined as any device, software, component, system, element, or arrangement or groups thereof that enable information and/or data to be entered as input commands by a user in a manner that directs the one or more processors 110b to execute instructions. The input interface may comprise a user interface (UI), a graphical user interface (GUI), such as, for example, a display, human-machine interface (HMI), or the like. Embodiments, however, are not limited thereto, and thus, this disclosure contemplates the input interface comprising a keypad, touch screen, multi-touch screen, button, joystick, mouse, trackball, microphone and/or combinations thereof.

As used herein, the output interface is defined as any device, software, component, system, element or arrangement or groups thereof that enable information/data to be presented to a user. The output interface may comprise one or more of a visual display or an audio display, including, but not limited to, a microphone, earphone, and/or speaker. One or more components of the mobile device 100a may serve as both a component of the input interface and a component of the output interface.

The personal computing device 100b also includes a network interface 140b operable to facilitate connection to the network 300.

Figure 4:
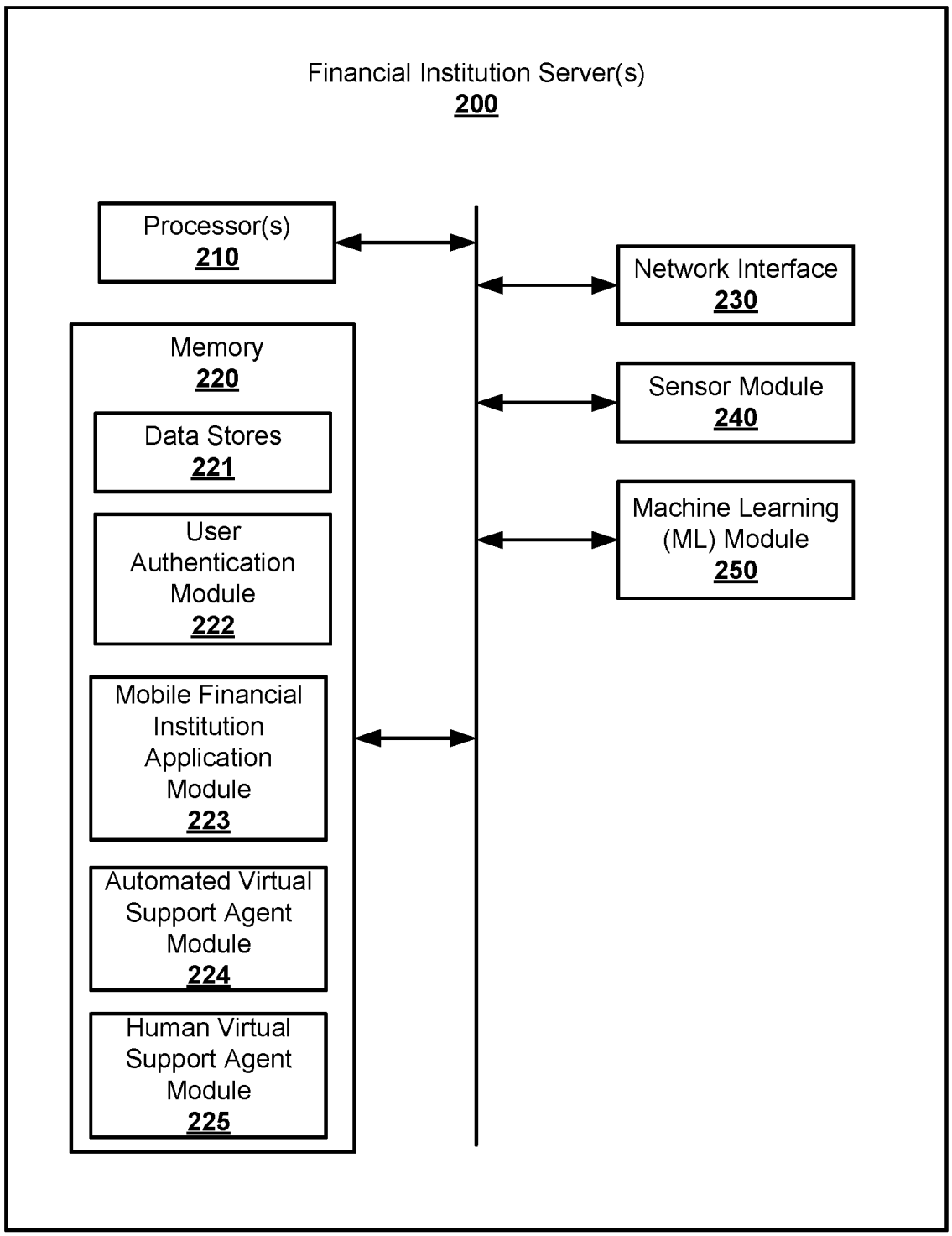
FIG. 4 illustrates a block diagram of the one or more financial institution servers of FIG. 1.

As illustrated in FIG. 4, the one or more financial institution servers 200 includes one or more processors 210, a non-transitory memory 220 operatively coupled to the one or more processors 210, a network interface 230, a sensor module 240, and a machine learning (ML) module 250. Some of the possible operational elements of each server in the one or more financial institution servers 200 are illustrated in FIG. 4 and will now be described herein. It will be understood that it is not necessary for each server in the one or more financial institution servers 200 to have all the elements illustrated in FIG. 4. For example, each server in the one or more financial institution servers 200 may have any combination of the various elements illustrated in FIG. 4. Moreover, each server in the one or more financial institution servers 200 may have additional elements to those illustrated in FIG. 4.

The one or more financial institution servers 200 may be controlled by a system manager (or policy manager) of the financial institution.

In accordance with one or more embodiments set forth, described, and/or illustrated herein, the one or more financial institution servers 200 may comprise a computing device, including but not limited to a server computer, a desktop computer, a laptop computer, a smart phone, a handheld personal computer, a workstation, a game console, a cellular phone, a mobile device, a personal computing device, a wearable electronic device, a smartwatch, smart eyewear, a tablet computer, a convertible tablet computer, or any other electronic, microelectronic, or micro-electromechanical device for processing and communicating data. This disclosure contemplates the one or more financial institution servers 200 comprising any form of electronic device that optimizes or otherwise transforms the performance and functionality of the one or more embodiments in a manner that falls within the spirit and scope of the principles of this disclosure.

The memory 220 comprises a set of instructions of computer-executable program code. The set of instructions are executable by the one or more processors 210 in manner that facilitates control of a user authentication module 222, a mobile financial institution application module 223 having one or more mobile financial institution applications that reside in the memory 220, an automated virtual support agent module 224, and a human virtual support agent module 225. In accordance with one or more embodiments set forth, described, and/or illustrated herein, the one or more financial institution servers 200 may individually or collectively execute the instructions to perform any one or more of the methodologies set forth, described, and illustrated herein.

The memory 220 also includes one or more data stores 221 that are operable to store one or more types of data, including but not limited to, user account data, user authentication data, sensor data, etc. For instance, the one or more data stores 221 may comprise a storage location on which one or more electronic files of the transcripts associated with virtual chat communications reside. The one or more data stores 221 may comprise volatile and/or non-volatile memory. Examples of suitable data stores 221 include, but are not limited to RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable non-transitory storage medium, or any combination thereof. The one or more data stores 221 may be a component of the one or more processors 210, or alternatively, may be operatively connected to the one or more processors 210 for use thereby. As set forth, described, and/or illustrated herein, "operatively connected" may include direct or indirect connections, including connections without direct physical contact.

The memory 220 may include a single machine-readable medium, or a plurality of media (e.g., a centralized or distributed database, or associated caches and servers) operable to store the instructions. The term "machine-readable medium" shall also be taken to include any medium, or combination of multiple media, that is capable of storing instructions (e.g., software) for execution by a server (e.g., server), such that the instructions, when executed by the one or more processors 210, cause the one or more financial institution servers 200 to perform any one or more of the methodologies set forth, described, and illustrated herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof. The memory 220 can store computer readable program code and data which, when executed by the one or more processors 210 (or other processor) can implement (or cause to be implemented) any of the features and methodologies described herein.

The computer-executable program code may instruct the one or more processors 210 to cause the user authentication module 221 to authenticate a user in order to gain user access to the one or more financial accounts. The user authentication module 221 may be caused to request user input user data or user identification that include, but are not limited to, user identity (e.g., username), a user passcode, a cookie, user biometric data, a private key, a token, and/or another suitable authentication data or information.

The computer-executable program code may instruct the one or more processors 210 to execute certain logic, data-processing, and data-storing functions of the one or more financial institution servers 200, in addition to certain communication functions of the one or more financial institution servers 200. The one or more mobile financial institution applications of the mobile financial institution application module 222 are operable to communicate with the first client device 100*a* and the second client device 100*b* in a manner which facilitates user access to the one or more financial accounts in addition to user management of the one or more financial accounts based on successful user authentication.

The sensor module 240 is operable, at least during execution of the mobile application or desktop application by the client device 100, to dynamically detect, determine, assess, monitor, measure, quantify, and/or sense information about the client device 100. The sensor module 240 may be operable to detect, determine, assess, monitor, measure, quantify and/or sense in real-time. The sensor module 240 may be operable to detect, determine, assess, monitor, measure, quantify, and/or sense geographic location information about the geographic location of the client device 100.

The ML module 250 may include one or more ML algorithms to train one or more machine learning models of the one or more financial institution servers 200 based on data and/or information resided in the memory 220. The ML algorithms may include one or more of a linear regression algorithm, a logical regression algorithm, or a combination of different algorithms. A neural network may also be used to train the system based on the received data. The ML module 250 may analyze the received data and/or information, and transform the data and/or information in a manner which provides enhanced communication between the client device 100 and the one or more financial institution servers 200, while also enhancing user access and management of the one or more financial accounts. The data and/or information may also be up-linked to other systems and modules in the one or more financial institution servers 200 for further processing to discover additional information that may be used to enhance the understanding of the information.

In accordance with one or more embodiments set forth, described, and/or illustrated herein, the network 300 may comprise a wireless network, a wired network, or any suitable combination thereof. For example, the network 300 is operable to support connectivity using any protocol or technology, including, but not limited to wireless cellular, wireless broadband, wireless local area network (WLAN), wireless personal area network (WPAN), wireless short distance communication, Global System for Mobile Communication (GSM), or any other suitable wired or wireless network operable to transmit and receive a data signal.

In accordance with one or more embodiments set forth, described, and/or illustrated herein, a user may, via the client device 100, execute a mobile application or desktop application associated with the financial institution over the communication network 300.

Figure 5:
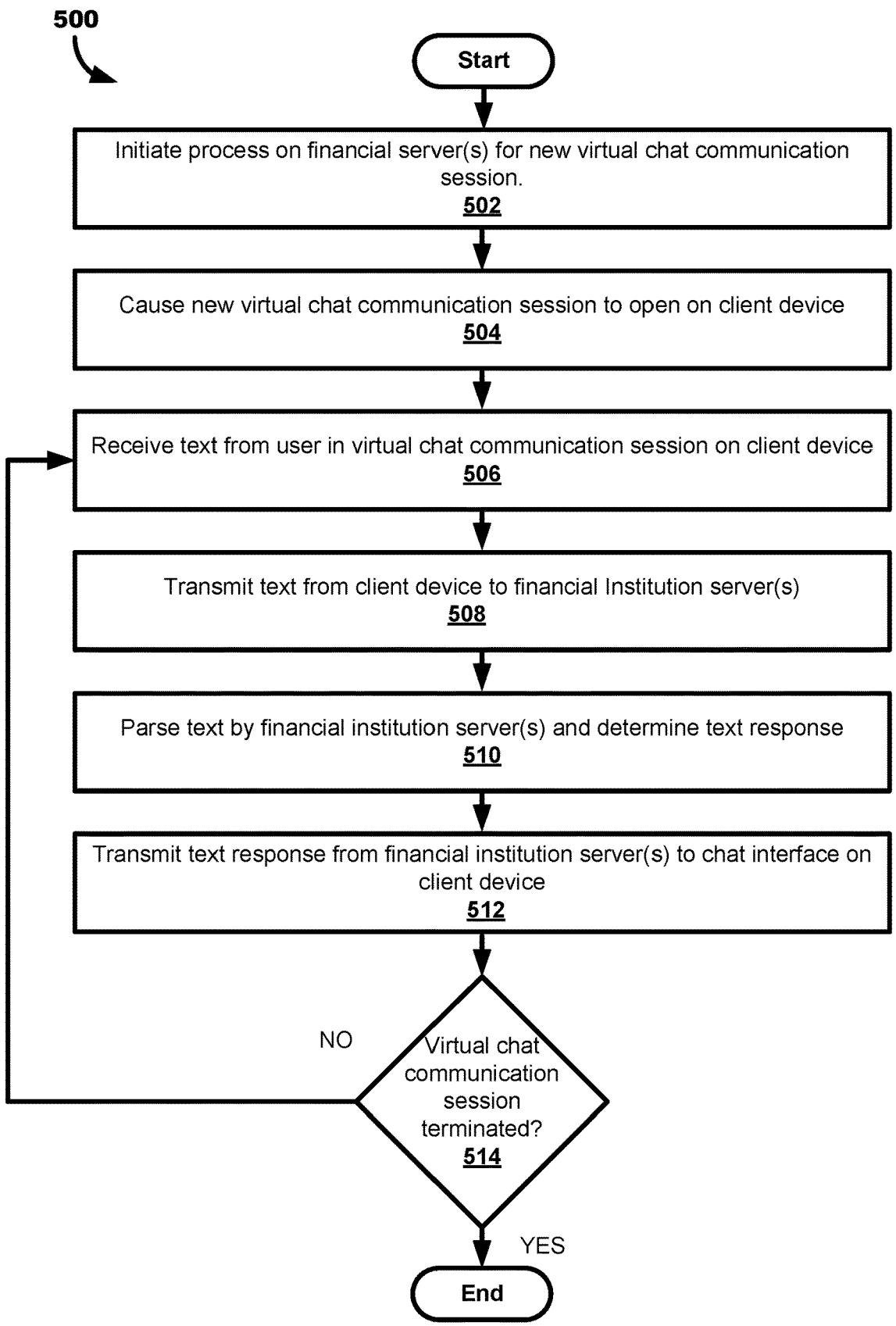
FIG. 5 illustrates a computer-implemented method for implementing a chat communication session with a virtual support agent, in accordance with one or more embodiments set forth and described herein.
Figure 6:
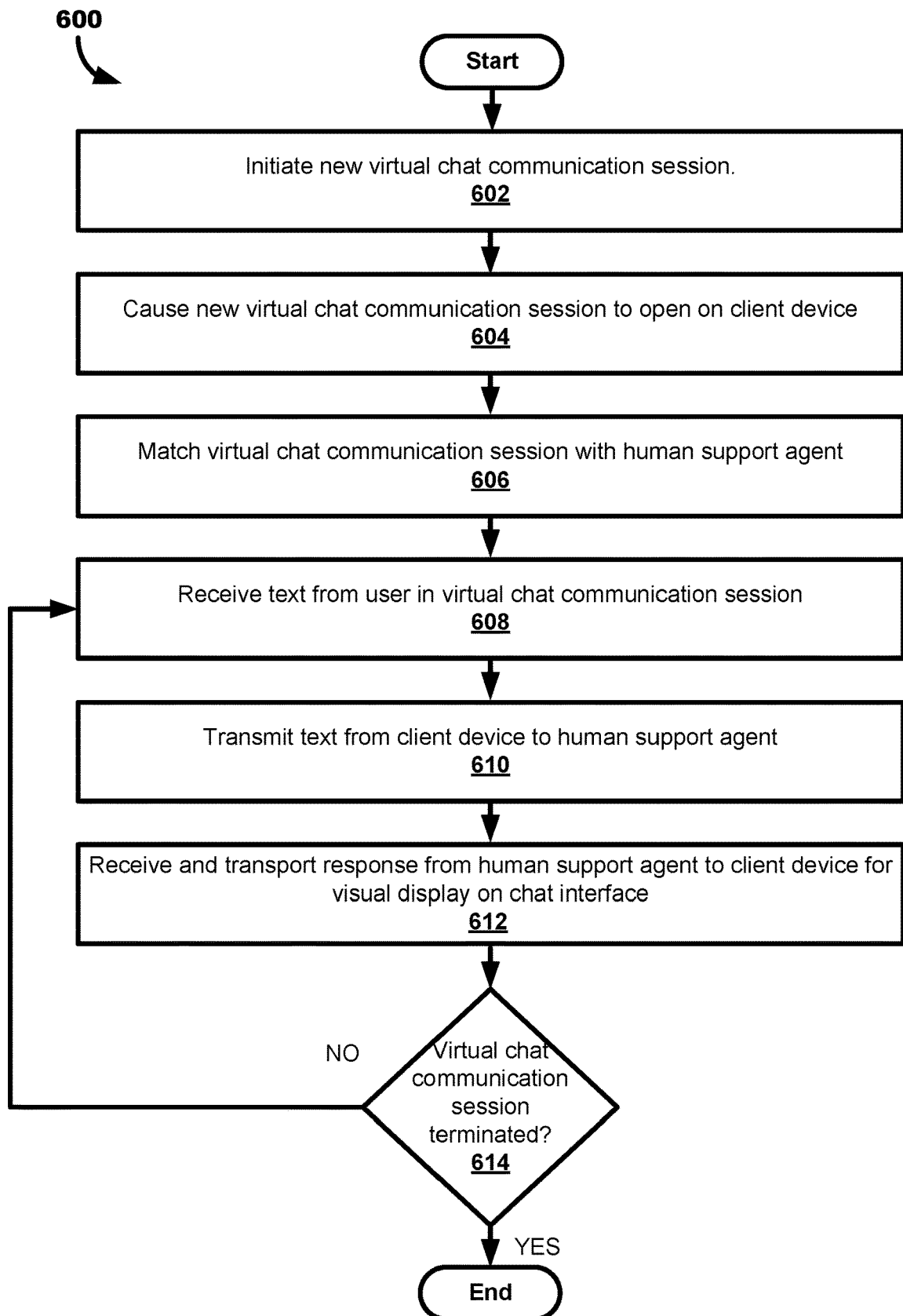
FIG. 6 illustrates a computer-implemented method for implementing a chat communication session with a human virtual support agent, in accordance with one or more embodiments set forth and described herein.

Illustrated examples shown in FIGS. 5 to 6 set forth computer-implemented methods 500 and 600. In one or more examples, the respective flowcharts of the computer-implemented methods 500 and 60 may be implemented by the one or more processors 210 of the one or more financial institution servers 200. In particular, the computer-implemented methods 500 and 600 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

In accordance with one or more embodiments set forth, described, and/or illustrated herein, software executed by the one or more financial institution servers 200 provides functionality described or illustrated herein. In particular, software executed by the one or more processors 210 is operable to perform one or more processing blocks of the computer-implemented methods 500 and 600 set forth, described, and/or illustrated herein, or provides functionality set forth, described, and/or illustrated.

As illustrated in FIG. 5, a computer-implemented method can implement a virtual chat communication session between a user and a virtual support agent, in accordance with one or more embodiments set forth and described herein. Illustrated process block 502 causes the one or more processors 210 to initiate a new dedicated process in order to facilitate a new virtual chat communication session. This initiation may include such operations as allocating memory, adding the new virtual chat communication session to a chat queue (of all virtual chat communication sessions administered by the financial institution server(s) 200), and all other such tasks. From illustrated process block 502, the method proceeds to illustrated process block 504, which causes a new virtual chat communication session to open on the client device 100 by causing software executing on the client device 100 to display a GUI showing the new virtual chat communication session. A virtual chat communication session can be a stand-alone chat interface comprising a chat window, or a chat window superimposed over a chat widget (discussed further herein) or any GUI which functions to facilitate a virtual chat communication session between a user and a virtual support agent. The one or more processors 210 would communicate with a process executing on the client device 100 so that the process (could be an application program executing on the client device, a web browser, the operating system on the client device 100 itself, etc.) instructs the client device 100 to open the new virtual chat communication session by utilizing a GUI on the interface 131*a*, 131*b* of the client device 100.

In illustrated process block 506, text is entered (typed, spoken, etc.) into the GUI on the client device 100 and received by the respective application on the client device 100.

From illustrated process block 506, the method 500 proceeds to illustrated process block 508 which transmits the text received from illustrated process block 506 to the financial institution servers(s) 200 and routed to the respective process handling the particular virtual chat communication session.

In illustrated process block 510, the text is parsed (typically by the one or more processors 210 of the financial institution server(s) 200) by separating the words in the text and analyzing the text (using one or more such techniques, such as a rules-based system, a machine learning model (such as a convolution neural network), natural language processing (NLP), text mining, or the like.) A response to the text is generated using the one or more such techniques, which may include querying a database in memory 220 to retrieve the response. For example, should the user provide a text query "what is my account balance," the text analyzer would analyze the text to determine that there is an unknown quantity needed (the user's account balance), and then query the one or more financial institution server(s) 200 to retrieve the quantity needed (the user's account balance).

After the response is determined, the method 500 proceeds to illustrated process block 512 which then causes a visual display of the response (e.g., "Your balance is $1,000.00") on the chat interface visually displayed on the user interface 131*a*, 131*b*.

The method 500 proceeds to illustrated decision block 514, which determines whether the virtual chat communication session is terminated or not. A number of events may result in termination of the virtual chat communication session, including, but not limited to the user closing the chat window on the client device 100, the user communicating (textually and/or verbally) "end this chat" (or some similar phrase), a human virtual support agent manually terminating the virtual chat communication session, the lapse of a predetermined amount of time (e.g., 10 minutes) without receiving any input from the user on the client device 100, the user logging out of the mobile application or desktop application on the client device 100, etc. Note that if no event has occurred to terminate the virtual chat communication session, then the virtual chat communication session will continue. Should, in illustrated decision block 514, it be determined that the virtual chat communication session is terminated, then the computer-executable program code may instruct the one or more processors 210 to close the virtual chat communication session processes, and the virtual chat communication session would no longer require resources by the financial institution server(s) 200. Should, in illustrated decision block 514, it be determined that the virtual chat communication session has not been terminated, then the method 500 would return to illustrated process block 506.

In accordance with one or more embodiments described herein, a user can engage in multiple virtual chat communication sessions in parallel (i.e., contemporaneously or simultaneously) with different virtual support agents (human or automated) from a financial institution. This can be advantageous because the user may have separate issues to discuss, and while the user is waiting for a response from one virtual support agent, may engage in another virtual chat communication session another virtual support agent to discuss another issue. Executing multiple virtual chat communication sessions in parallel can also be advantageous in that the user can separate different issues into different respective virtual chat communication sessions, avoiding potential confusion of using a single virtual chat communication session to address different issues. Using multiple virtual chat communication sessions can also be advantageous because a user may have one complex issue which requires a human virtual support agent while also having a simple issue which could be addressed by a virtual agent, so utilizing separate virtual chat communication sessions for each (one session with a human virtual support agent and one session with a virtual agent) would preserve resources at the financial institution.

As illustrated in FIG. 6, a computer-implemented method can implement a virtual chat communication session between a user and a human virtual support agent, in accordance with one or more embodiments set forth and described herein. Illustrated process blocks 602 and 604 can be implemented the same as illustrated process blocks 502 and 504, respectively, from FIG. 5.

In illustrated process block 606, the virtual chat communication session for the user is matched with a human virtual support agent. The financial institution may have one or more human virtual support agents having access to the financial institution server(s), and whom have their own client device to facilitate communication with the user via a virtual chat communication session. The computer-executable program code may instruct the one or more processors 210 to match the virtual chat communication session with one of the plurality of human virtual support agents. The matching can be executed randomly, or a human virtual support agent can be selected based on certain criteria (e.g., linguistically compatible with a detected language used by the user, specialized knowledge and/or experience in the financial service being requested by the user, etc.)

The method 600 can proceed to illustrated process block 608, which is typically performed the same as illustrated process block 506 from FIG. 5.

The method 600 can proceed to illustrated process block 610, which includes transmitting the text received from the client device contemporaneously with a virtual chat communication session in illustrated process block 608 to the matched human virtual support agent for this respective virtual chat communication session, typically via the one or more financial institution server(s) 200.

Then, in illustrated process block 612, the human virtual support agent may textually or verbally communicate a response (the human virtual support agent could first conduct research of data/information stored in memory 220), which is routed by the one or more processors 210 for display on the user interface 131*a*, 131*b* of the client device 100.

The method 600 can then proceed to decision block 614, which determines whether the virtual chat communication session is terminated. This can be done identically to illustrated decision block 514 from FIG. 5. Should it be determined that the virtual chat communication session is terminated, then the chat window visually displayed on the user interface 131*a*, 131*b* of the client device 100 is closed (for this particular chat only, any remaining chats would still be active and visually displayed). Should it be determined that the virtual chat communication session is not terminated, the method 600 would return to illustrated process block 608.

Figure 7:
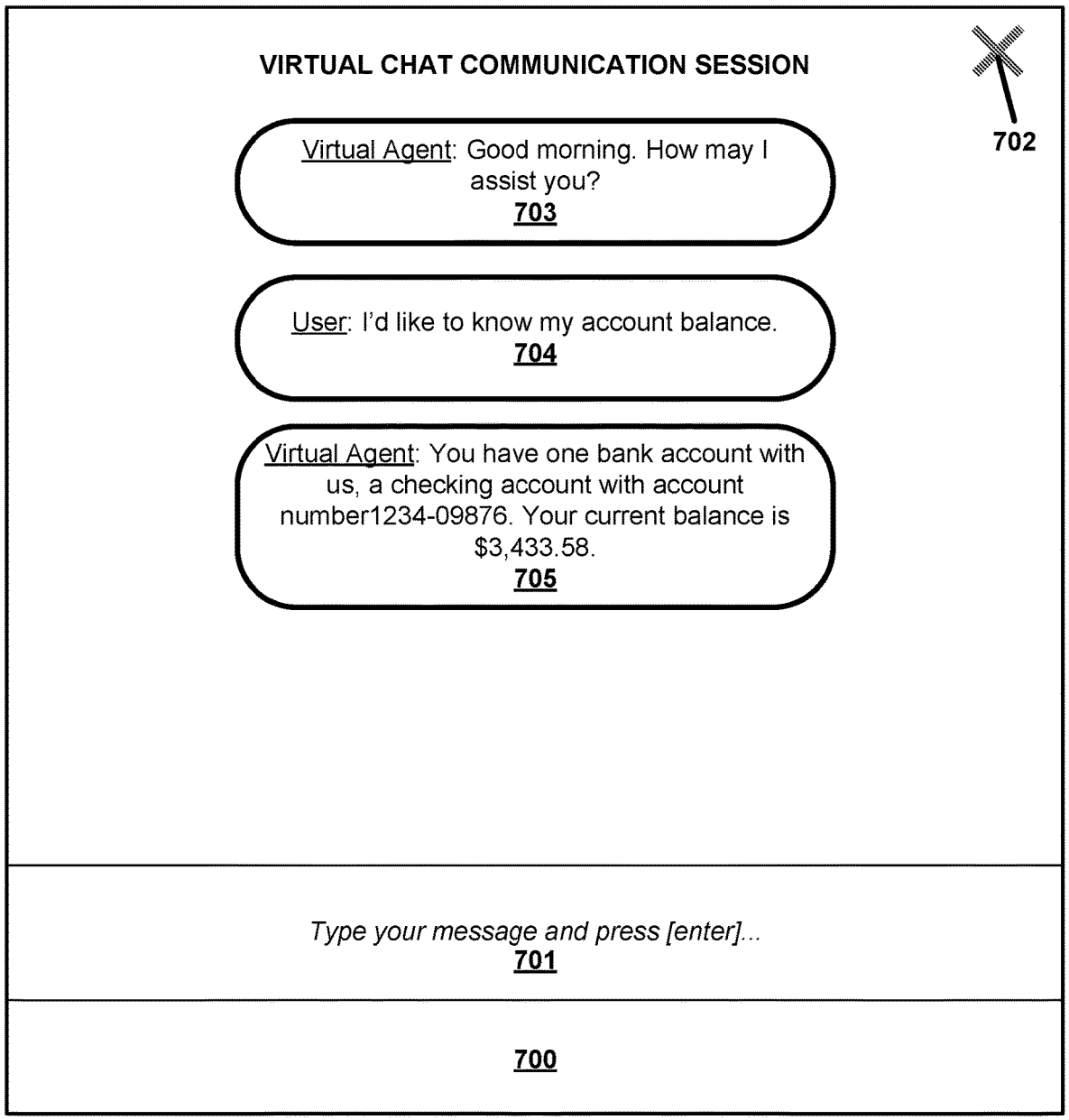
FIG. 7 illustrates a virtual chat communication session between a user and a support agent, in accordance with one or more embodiments set forth and described herein.

As illustrated in FIG. 7 (and all other Figures depicting a virtual chat communication session including FIGS. 8 and 9 and FIGS. 12 through 16), upon a user launching a financial institution mobile application or desktop application on the client device 100, and being authenticated by the user authentication module 221, the computer-executable program code may instruct the one or more processors 210 to cause a display of a GUI on the user interface 131*a*, 131*b* of the client device 100. The GUI comprises a chat interface (e.g., a chat window) 700 that facilitates a virtual chat communication session (e.g., a textual chat or a verbal chat) with a virtual support agent that comprises a plurality of chat messages 703 through 705. During the virtual chat communication session, the user may transmit a message 704 comprising a general request for information. The computer-executable program code may instruct the one or more processors 210 to analyze the request 704, and query the financial institution server(s) 200 for an answer to the inquiry 704 and respond by transmitting a message 705 providing information that was requested by the client device 100. In particular, in response to receipt of the user request 703 for information, the computer-executable program code may instruct the one or more processors 210 to cause a visual display of a message 705 on the chat interface on the user interface 131*a*, 131*b* of the client device 100. A chat box 701 is used for the user to type in the user's messages intended for the agent (e.g., queries, commands, etc.) which are then routed to the respective agent and the message is then also displayed as a message above the chat box 701.

In the example illustrated in FIG. 7, the user's personally identifiable information (PII) is fully displayed in the chat window on the client device 100. Such data and personally identifiable information includes, but is not limited to, the user's full legal name, residential address, social security number, government identification, passport information, credit card information, tax information, financial information, medical information, etc. The user may not wish to display this personally identifiable information for numerous reasons. For example, the user could be using a client device of another party with other people physically present, and thus, does not wish to expose the personally identifiable information to others. In addition, the user may be worried that the security of the client device may be comprised (e.g., a nefarious entity is "packet sniffing" the user's transmission) and wants to make sure no personally identifiable information transmitted could be used against the user in the future.

Figure 8:
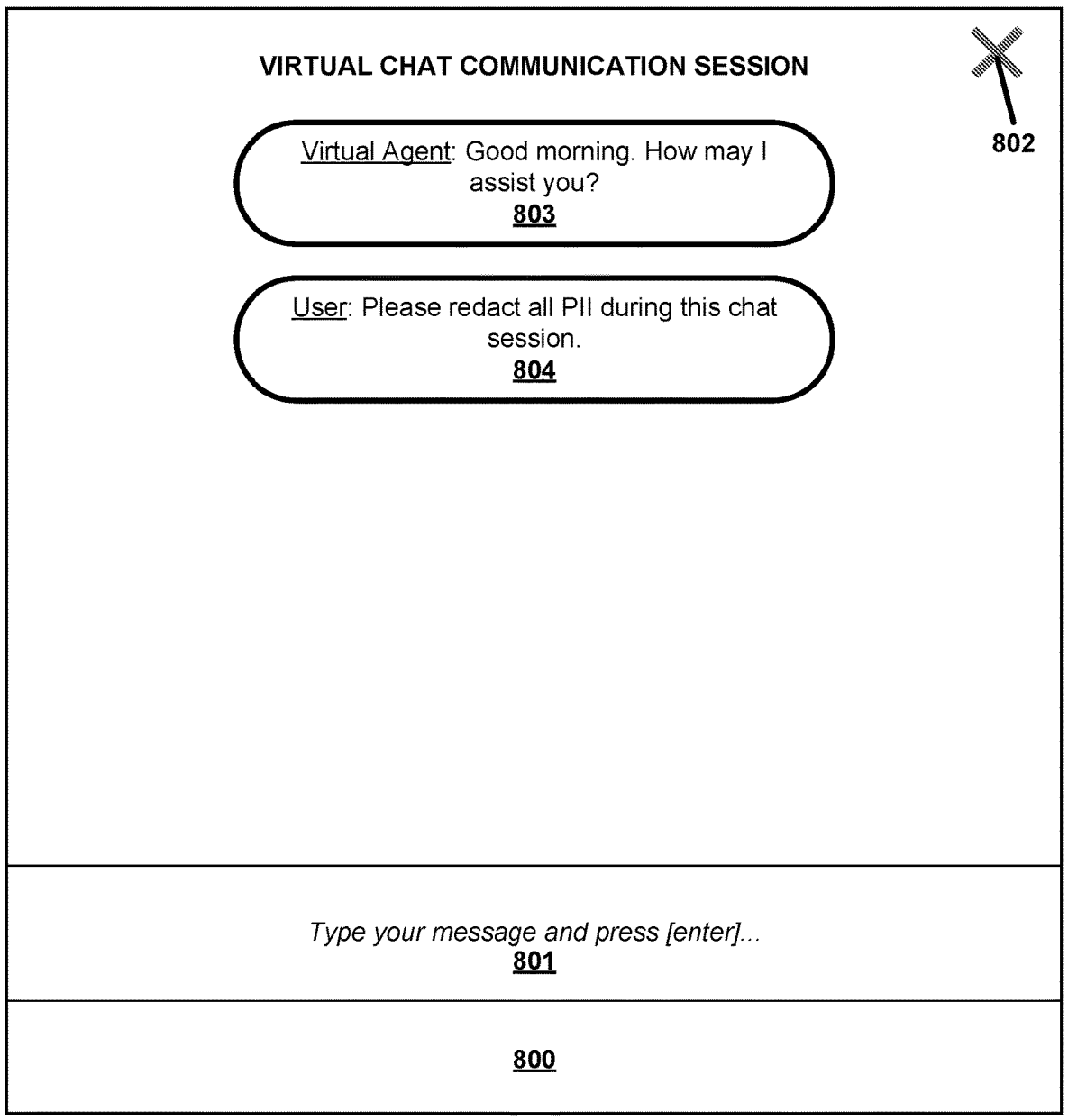
FIG. 8 illustrates a virtual chat communication session between a user and a support agent with the user issuing a command to redact all personally identifiable information (PII), in accordance with one or more embodiments set forth and described herein.

As illustrated in FIG. 8, a user issues a command to the agent in the virtual chat communication session to redact all personally identifiable information, in accordance with one or more embodiments set forth and described herein. Using the chat box 801, the user may enter a textual command to "redact all PII during this chat session." This command can come in many grammatical forms, e.g., "please remove all personal info", etc. Once the command is received, the support agent will then automatically redact all of the personally identifiable information (take all personally identifiable information and replace it with generic characters so that the personally identifiable information would not be transmitted to the user and displayed). However, information being transmitted and displayed that is not personally identifiable information would be transmitted and displayed intact (with no changes made). Such personally identifiable information includes, but is not limited to, the user's full legal name, residential address, social security number, government identification, passport information, account number(s), credit card information, tax information, financial information, medical information, etc.

Figure 9:
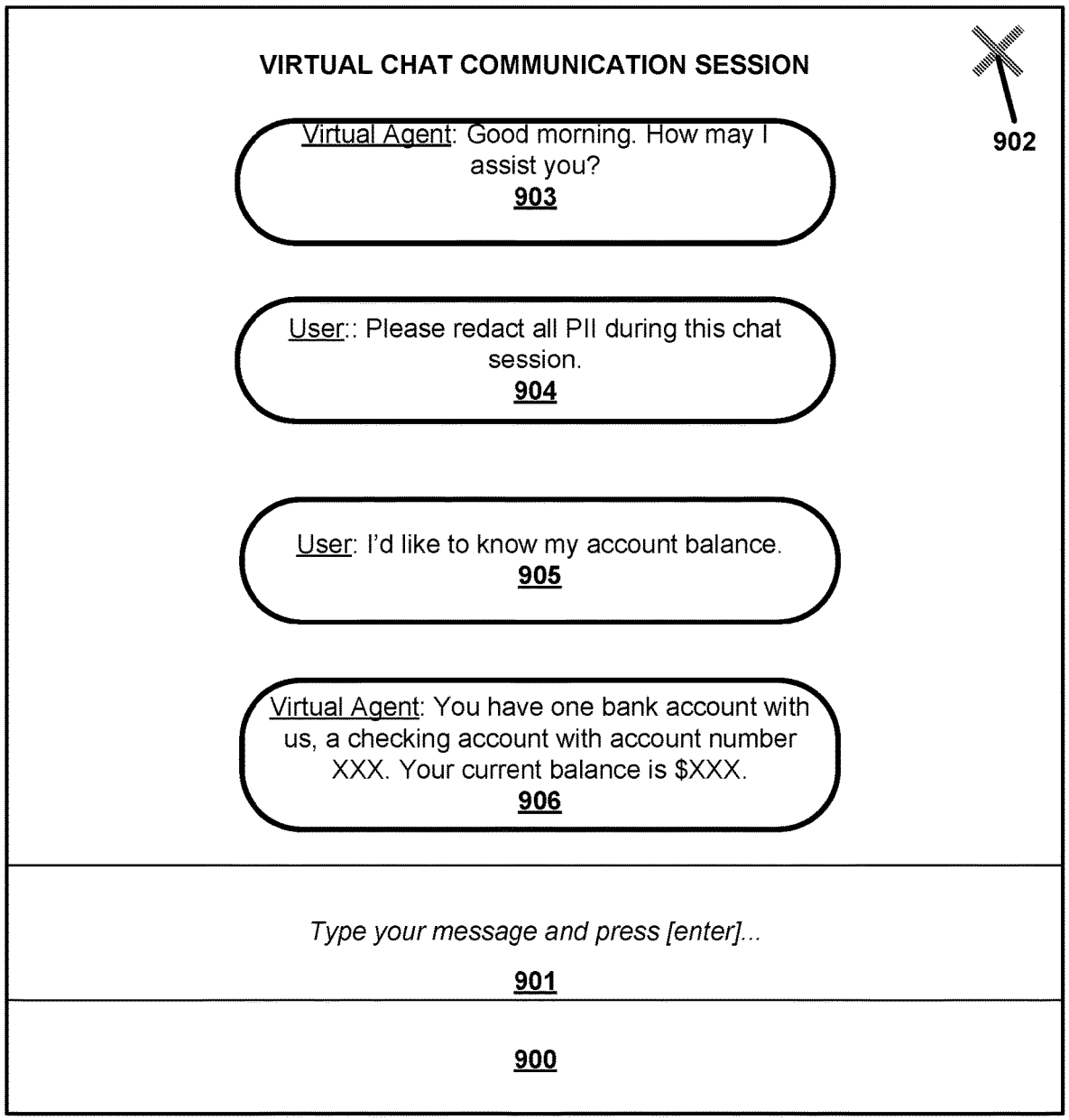
FIG. 9 illustrates a virtual chat communication session between a user and a support agent with personally identifiable information (PII) redacted, in accordance with one or more embodiments set forth and described herein.

As illustrated in FIG. 9, the virtual chat communication session between a user and a support agent is shown with the user's PII redacted, in accordance with one or more embodiments set forth and described herein. Note the difference between FIG. 9 and FIG. 7 (which is the same chat but for the user did not issue the command to redact PII of the user). The user's personally identifiable information has been redacted from the message 906 in the chat interface 900, thereby removing this information being transmitted to the user and displayed on the user's client device 100. Such personally identifiable information includes, but is not limited to, the user's full legal name, residential address, social security number, government identification, passport information, account number(s), credit card information, tax information, financial information, medical information, etc.

Figure 10:
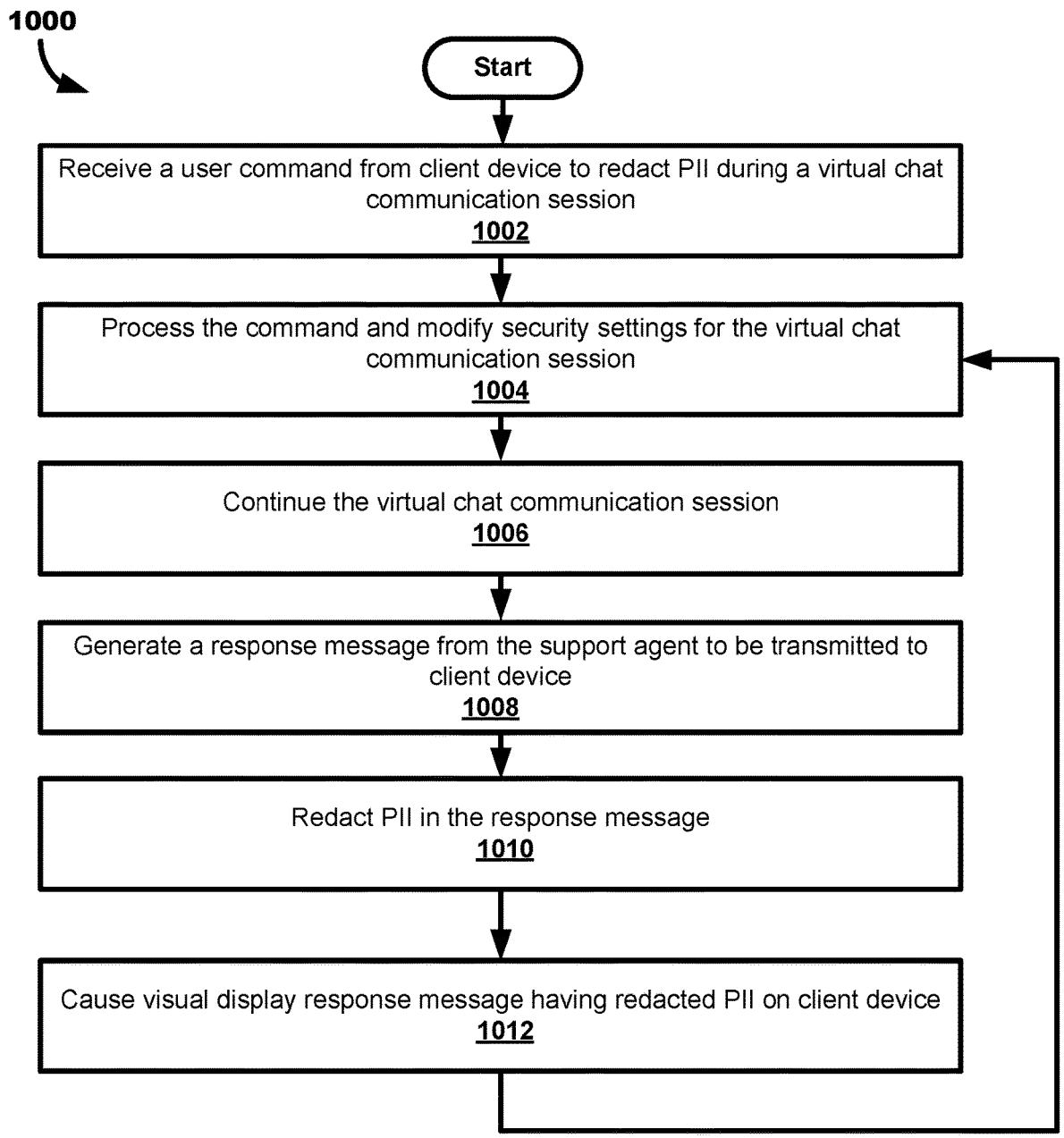
FIG. 10 illustrates a computer-implemented method for implementing a chat communication session enabling a user to issue commands to redact personally identifiable information (PII) of the user, in accordance with one or more embodiments set forth and described herein.
Figure 11:
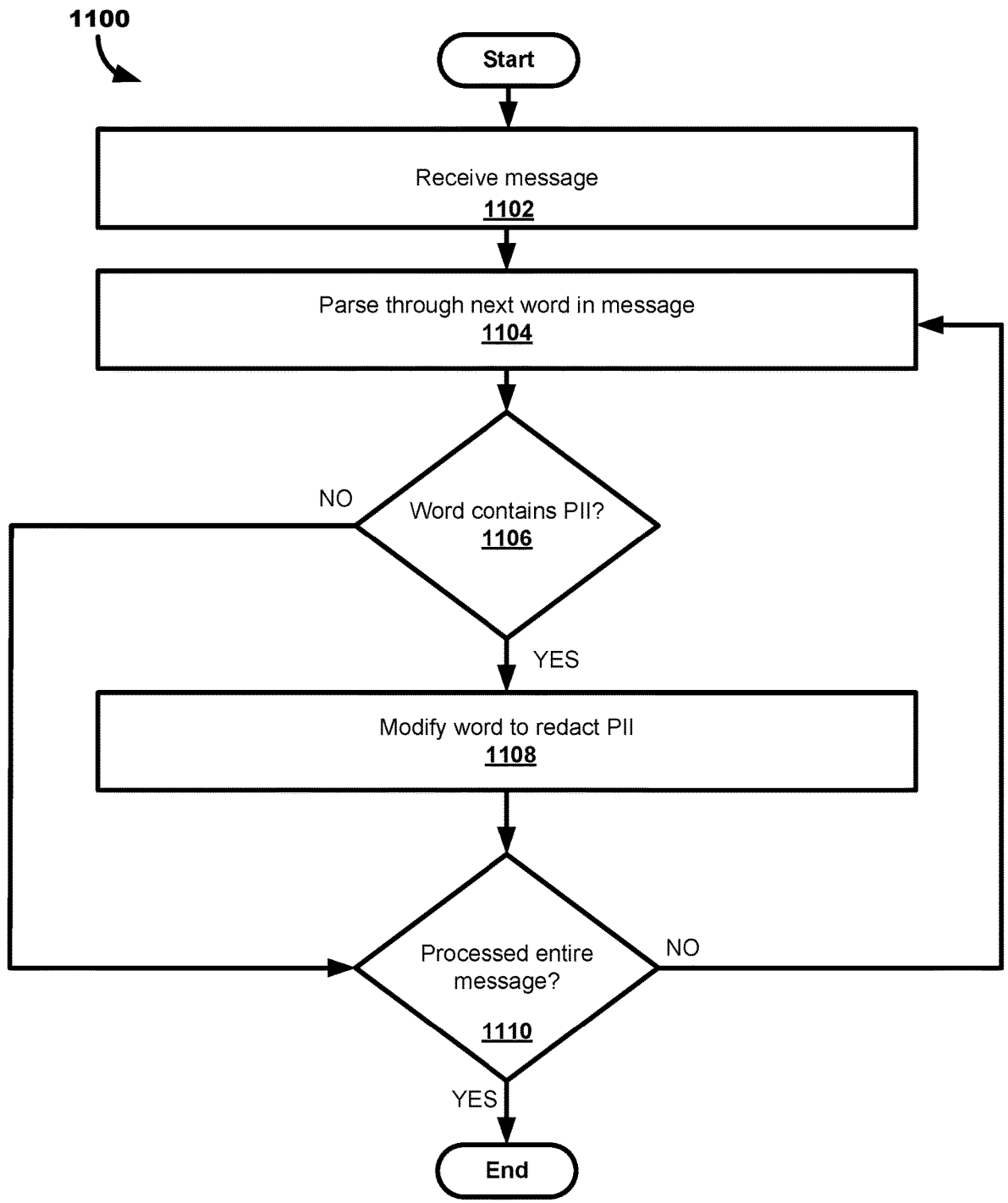
FIG. 11 illustrates a computer-implemented method for redacting a message to remove personally identifiable information (PII), in accordance with one or more embodiments set forth and described herein.

Illustrated example shown in FIGS. 10 and 11 set forth a computer-implemented methods 1000, 1100. In one or more examples, the respective flowcharts of the computer-implemented methods 1000 1100 may be implemented by the one or more processors 210 of the one or more financial institution servers 200. In particular, the computer-implemented methods 1000, 1100 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

As illustrated in FIG. 10, a computer-implemented method 1000 for implementing a chat communication session enables a user to issue commands to redact personally identifiable information (PII) of the user, in accordance with one or more embodiments set forth and described herein.

In illustrated process block 1002, a virtual chat communication session is already in progress between a user using a client device 100 and the one or more financial institution servers 200. A command (entered by the user) is received from the client device 100 to redact personally identifiable information of the user. The command can be, for example, a textual command entered into a chat box 801 of the chat interface 800 visually displayed on a graphical user interface of the client device 100. The command is transmitted from the client device 100 to the one or more financial institution servers 200.

The computer-implemented method 1000 continues to illustrated process block 1004, in which the command is received and processed by the one or more financial institution servers 200. The security settings (maintained on the one or more financial institution servers) for the current virtual chat communication session are modified by the one or more financial institution servers 200 to reflect that personally identifiable information visually displayed on the chat interface 800 will be redacted.

The computer-implemented method 1000 continues to illustrated process block 1006, which continues the virtual chat communication session (for example see FIGS. 5 and 6 which illustrate an example of how virtual chat communication sessions can be conducted).

The computer-implemented method 1000 continues to illustrated process block 1008, in which a message is generated by the one or more financial institution servers 200. Should the virtual chat communication session be conducted between the user and a human support agent of the financial institution, the response message is generated by the human support agent, and the response message is to be transmitted by the one or more financial institution servers 200.

The computer-implemented method 1000 continues to illustrated process block 1010, in which the response message is then processed such that the personally identifiable information is redacted from the message (see FIG. 11 for more details on how this is accomplished). Note that this operation applies only because in illustrated process block 1002 a command was received from the user to redact personally identifiable information of the user. Should no such command be received or acquired by the one or more financial institution servers 200, then no redaction of data and/or information will be implemented, and the computer-implemented method would proceed as per FIGS. 5 and 6.

The computer-implemented method 1000 continues to illustrated process block 1012, in which the one or more financial institution servers 200 cause the redacted response message 909 to be visually displayed in the chat interface 900. Note that the redacted response message is what is transmitted from the one or more financial institution servers 200 to the client device 100 over the network without the original response message being transmitted, which enhances security by removing the personally identifiable information from being transmitted to the client device 100.

As illustrated in FIG. 11, a computer-implemented method 1100 redacts a chat message to remove personally identifiable information, in accordance with one or more embodiments set forth and described herein. The chat message is a collection of words, each word is a text string separated by a space. The computer-implemented method 1100 can begin with the one or more processors 210 of the financial institution servers 200 parsing the chat message into separate words.

In illustrated process block 1102, the computer-implemented method 1100 includes receiving a chat message as a text string (or other data structure).

The computer-implemented method 1100 continues to illustrated process block 1104, which parses (separates) the next word in the chat message.

The computer-implemented method 1100 continues to illustrated decision block 1106, in which the one or more processors 210 of the one or more financial institution servers 200 determines whether the word parsed in illustrated process block 1104 contains personally identifiable information of the user. This can be executed by comparing the word (as well as the previous and subsequent words) to determine if the word contains personally identifiable information of the user. Any word containing a set of numbers is going to more likely be determined to contain personally identifiable information. An optional method of identifying whether a word contains personally identifiable information is when the response message is generated by the one or more financial institution servers 200, the one or more financial institution servers 200 also utilizes a data structure which identifies which words contain personally identifiable information (but typically this information is not part of the reply message).

Should, in illustrated decision block 1106, the word not contain personally identifiable information, then the computer-implemented method 1100 proceeds to illustrated decision block 1110. Should in illustrated decision block 1106, the word does contain personally identifiable information, then the computer-implemented method 1100 proceeds to illustrated process block 1108 in which the one or more processors 210 of the one or more financial institution servers 200 redacts the word to remove all personally identifiable information therefrom. For example, the PII would be replaced with one or more characters (such as "X'). Thus, for example, "1234555" would be replaced with "XXX." In accordance with one example embodiment, the word with personally identifiable information would be partially redacted, for example "1234555" would be replaced with "XXXXX55," thereby leaving some of the digits or characters of the personally identifiable information intact for visual display on the chat interface.

From illustrated decision block 1106 (when the current word does not contain personally identifiable information) or illustrated process block 1108 (when the current word contains personally identifiable information), the computer-implemented method 1100 proceeds to illustrated decision block 1110, in which a determination is made as to whether all of the words in the entire response message have been processed. Should the entire message not be processed, then the computer-implemented method 1100 returns to illustrated process block 1104, where the next word in the message is parsed. Should it be determined that the entire response message has been processed, then the computer-implemented method 1100 is completed and the result is the entire redacted response message.

Figure 12:
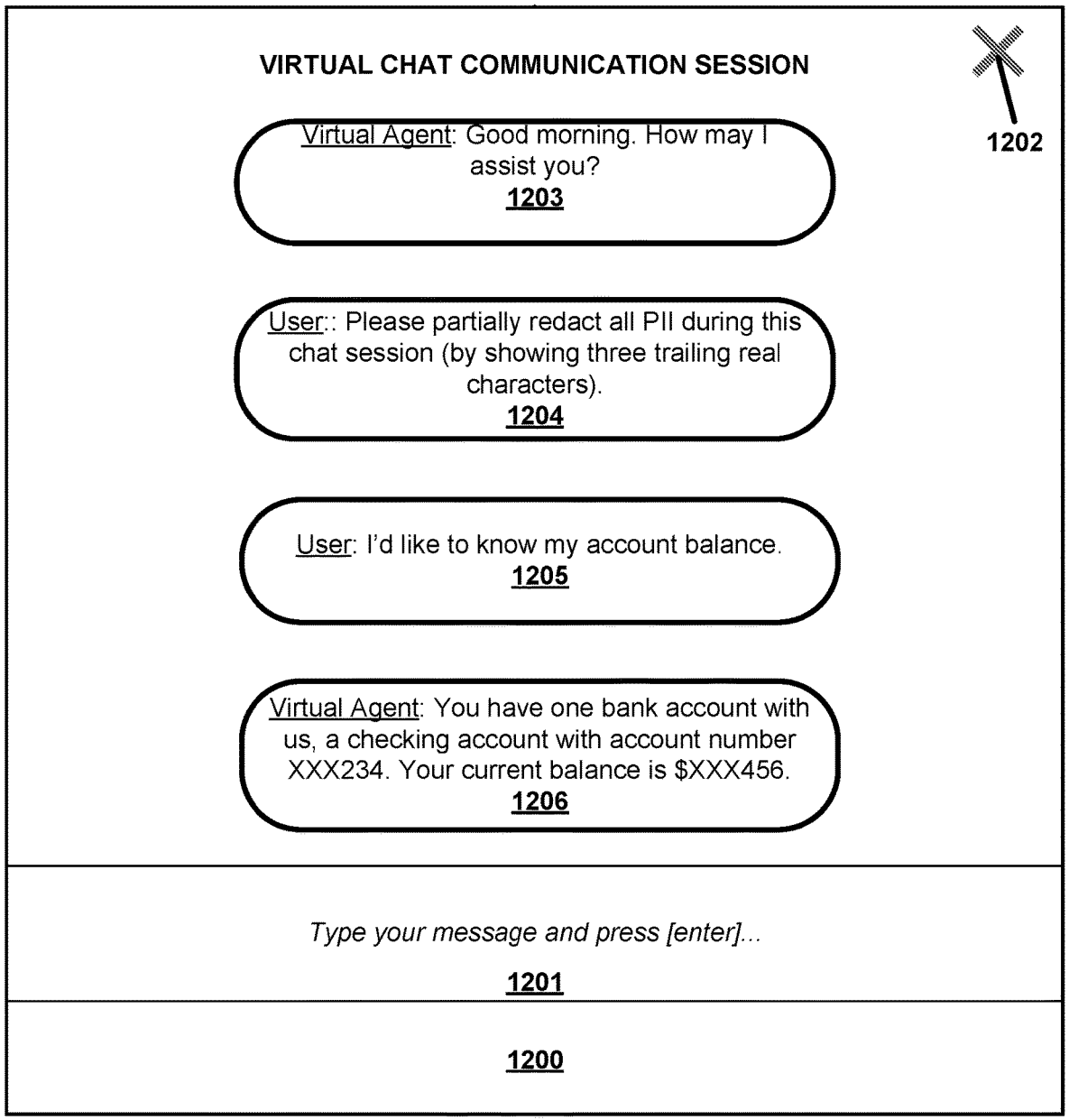
FIG. 12 illustrates a virtual chat communication session between a user and a support agent with the user issuing a command to partially redact all personally identifiable information (PII), in accordance with one or more embodiments set forth and described herein.

As illustrated in FIG. 12, a virtual chat communication session is implemented between a user and a support agent on the client device 100 with the user issuing a command to partially redact all personally identifiable information, in accordance with one or more embodiments set forth and described herein. In chat interface 1200, the user, via the client device 100, transmits a command in chat message 1204 to "partially redact all PII by only showing three trailing real characters."

Figure 13:
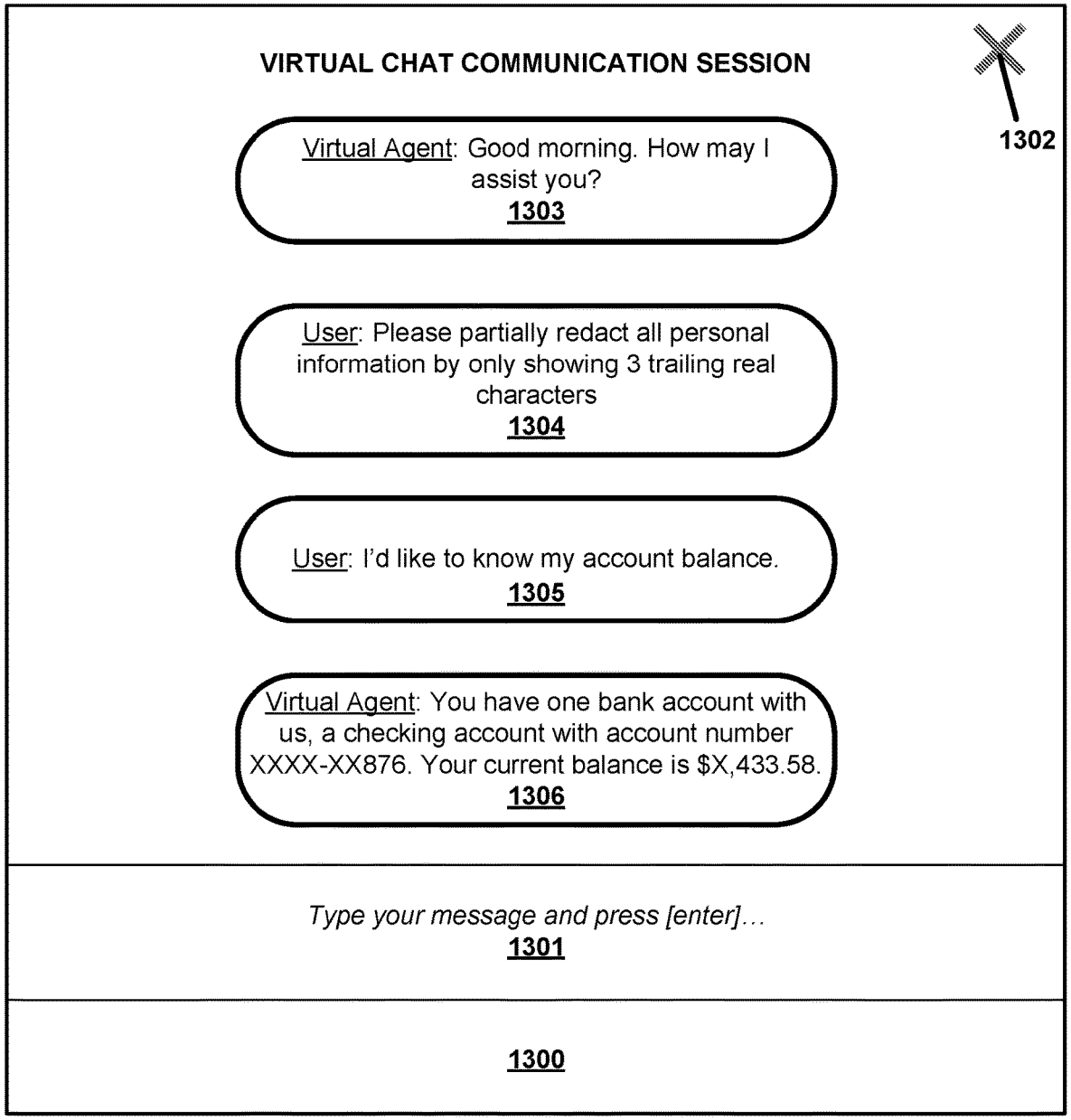
FIG. 13 illustrates a virtual chat communication session between a user and a support agent with personally identifiable information (PII) partially redacted, in accordance with one or more embodiments set forth and described herein.

As illustrated in FIG. 13, a virtual chat communication session is implemented on the client device 100 between a user and a support agent with personally identifiable information partially redacted, in accordance with one or more embodiments set forth and described herein.

In response to the user, via the client device 100, transmitting a command as a chat message 1304 to partially redact personally identifiable information of the user before transmission and visual display on the chat interface 1300. The user requests account balance information in the chat message 1305. In response, the one or more financial institution servers 200 cause a partially redacted message 1306 to be transmitted and visually displayed in the chat interface 1300. In the partially redacted message 1306, all personally identifiable information is redacted and replaced with a dummy character (e.g., "X"), but the trailing three digits are left intact as per the command. The user is able to request any number of characters/digits to be left intact (with the remaining characters/digits to be replaced with the dummy character).

Figure 14:
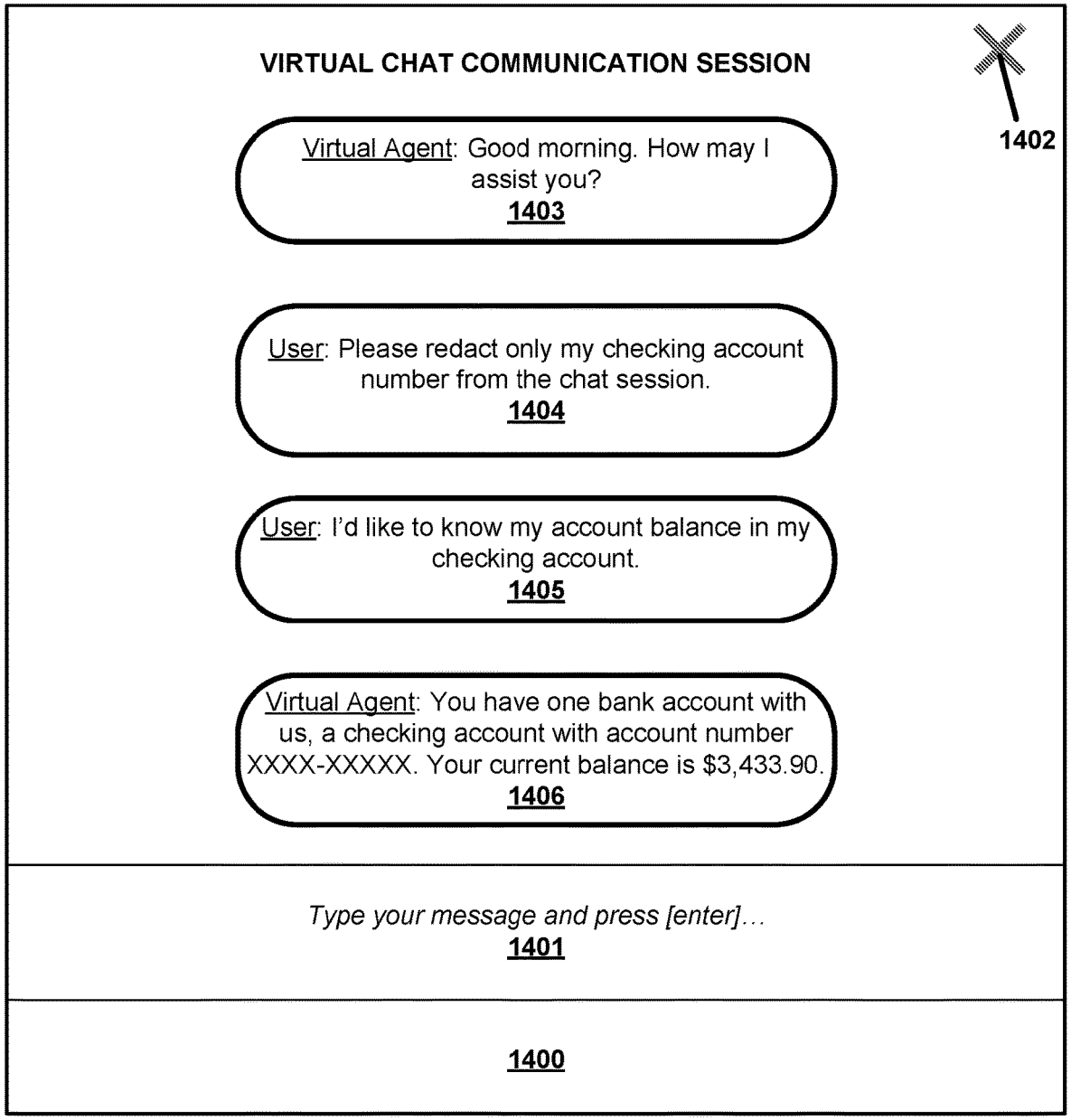
FIG. 14 illustrates a virtual chat communication session between a user and a support agent with the user issuing a command to partially redact only financial account number of the users, in accordance with one or more embodiments set forth and described herein.

As illustrated in FIG. 14, a virtual chat communication session is implemented on the client device 100 between a user and a virtual support agent. In the chat interface 1400, the user, via the client device 100, transmits a command as chat message 1404 to " . . . redact only my checking account number from the chat session." In response thereto, the chat message 1406 is selectively redacted by redacting the checking account number before transmission and visual display on the chat interface 1400. In the selectively redacted message 1406, the checking account information is redacted, but the checking account balance, although personally identifiable information, is not redacted and visually displayed intact. The user is able to request any type of personally identifiable information to be redacted while other types of personally identifiable information will not be redacted.

Figure 15:
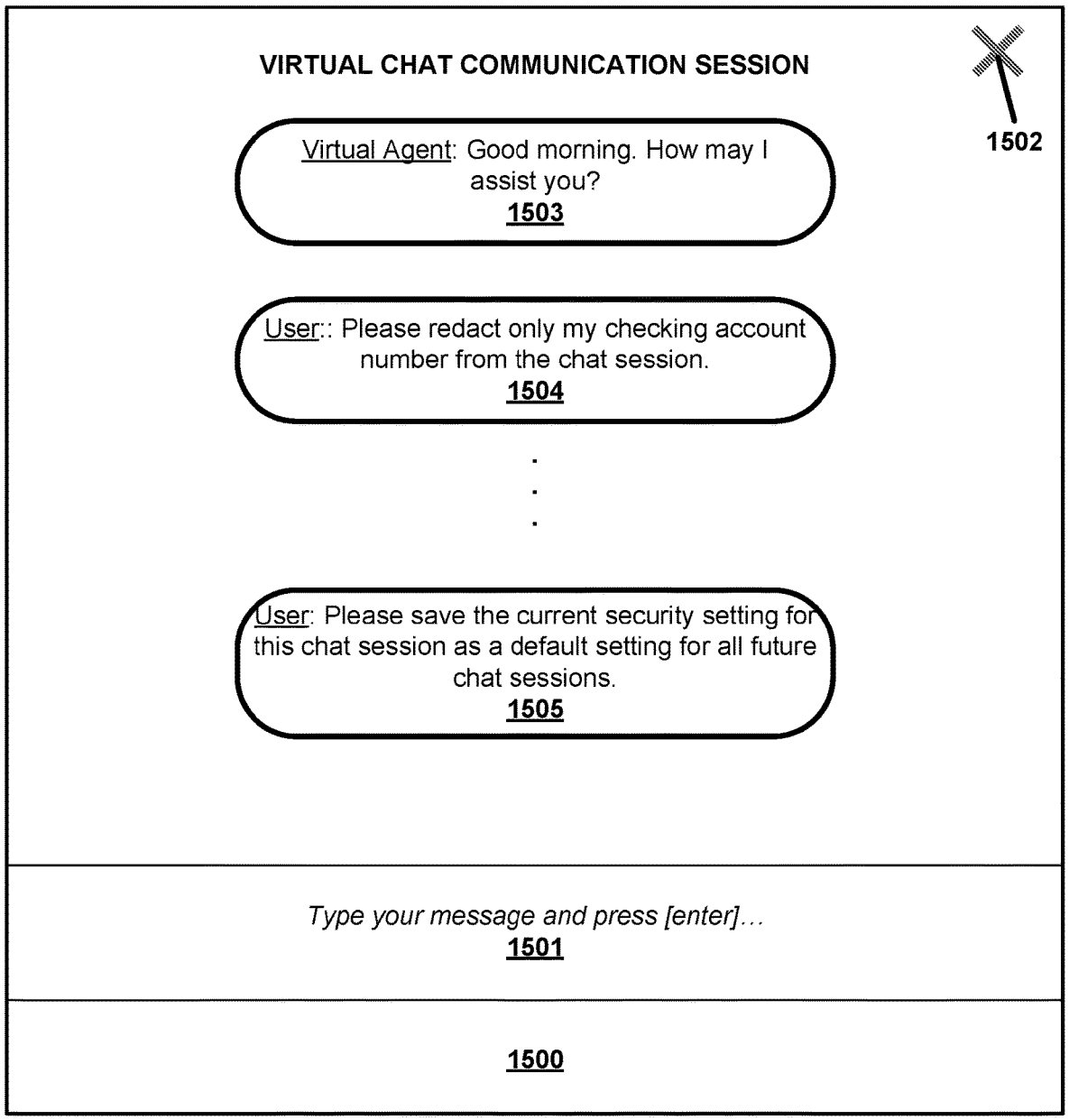
FIG. 15 illustrates a virtual chat communication session between a user and a support agent with bank account information redacted, in accordance with one or more embodiments set forth and described herein.

As illustrated in FIG. 15, a virtual chat communication session is implemented on the client device 100 between a user and a virtual support agent. In the chat interface 1500, the user, via the client device 100, transmits a command as chat message 1504 to " . . . redact only my checking account number from the chat session." Later in the virtual chat communication session, the user, via the client device 100, transmits another command as chat message 1505 to " . . . save the current security setting as a default setting for all future chat sessions." In response thereto, the one or more financial institution servers 200 may cause the command to be saved as a security setting (or rule) to be implemented for all future virtual chat communication sessions between the user and a virtual support agent associated with the financial institution. Alternatively or additionally, the one or more financial institution servers 200 may cause the population of one or more user input fields in a security setting dashboard of the mobile application or desktop application associated with the financial institution.

In accordance with one or more embodiments set forth, described, and/or illustrated herein, the client device 100 and the one or more financial institution servers 200 could function in a fully virtualized environment. A virtual machine is where all hardware is virtual and the operation is run over a virtual processor. The benefits of computer virtualization have been recognized as greatly increasing the computational efficiency and flexibility of a computing hardware platform. For example, computer virtualization facilitates multiple virtual computing machines to execute on a common computing hardware platform. Similar to a physical computing hardware platform, virtual computing machines include storage media, such as virtual hard disks, virtual processors, and other system components associated with a computing environment. For example, a virtual hard disk can store the operating system, data, and application files for a virtual machine. Virtualized computer system includes computing device or physical hardware platform, virtualization software executing on hardware platform, and one or more virtual machines executing on hardware platform by way of virtualization software. Virtualization software is therefore logically interposed between the physical hardware of hardware platform and guest system software executing "in" virtual machine.

Memory of the hardware platform may store virtualization software and guest system software executing in virtual machine. Virtualization software performs system resource management and virtual machine emulation. Virtual machine emulation may be performed by a virtual machine monitor (VMM) component. In typical implementations, each virtual machine (only one shown) has a corresponding VMM instance. Depending on implementation, virtualization software may be unhosted or hosted. Unhosted virtualization software generally relies on a specialized virtualization kernel for managing system resources, whereas hosted virtualization software relies on a commodity operating system: the "host operating system," such as Windows or Linux to manage system resources. In a hosted virtualization system, the host operating system may be considered as part of virtualization software.

The system and method described herein may be at least partially processor-implemented, the one or more processors 210 being an example of hardware. For example, at least some of the operations of the computer-implemented methods may be performed by the one or more processors 210 or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors 210, not only residing within a single machine, but deployed across a plurality of machines. In some example embodiments, the one or more processors 210 or processor-implemented modules may be located in a single geographic location (e.g., within a home environment, an office environment, or a server farm). In other example embodiments, the one or more processors or processor-implemented modules may be distributed across a plurality of geographic locations.

Devices that are described as in "communication" with each other or "coupled" to each other need not be in continuous communication with each other or in direct physical contact, unless expressly specified otherwise. On the contrary, such devices need only transmit to each other as necessary or desirable, and may actually refrain from exchanging data most of the time. For example, a machine in communication with or coupled with another machine via the Internet may not transmit data to the other machine for a long period of time (e.g. weeks at a time). In addition, devices that are in communication with or coupled with each other may communicate directly or indirectly through one or more intermediaries.

The terms "coupled," "attached," or "connected" may be used herein to refer to any type of relationship, direct or indirect, between the components in query, and may apply to electrical, mechanical, fluid, optical, electromagnetic, electromechanical, or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the exemplary embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A server computer system, comprising:
one or more processors; and
a non-transitory memory coupled to the one or more processors, the non-transitory memory including a set of instructions of computer-executable program code, which when executed by the one or more processors, cause the server computer system to:
cause, during execution of a mobile application or desktop application associated with a financial institution by a client device of a user over a communication network, a visual display of a chat interface on the client device to facilitate a virtual chat communication session between the user and a virtual support agent of the financial institution;
receive, from the client device contemporaneously within the virtual chat communication session, a textual command to redact personally identifiable information (PII) of the user;
apply a neural network to parse the words in the textual command;
modify, in response to the textual command, a user security setting to reflect redacting of PII visually displayed on the chat interface;
receive, from the client device contemporaneously within the virtual chat communication session, a user request for information;
generate, in response to the user request for information and contemporaneously within the virtual chat communication session, a reply message;
utilize a data structure to identify PII in the words of the generated reply message;
automatically redact the identified PII in the generated reply message; and
transmit, contemporaneously within the virtual chat communication session, the redacted reply message to the client device for visual display on the chat interface of the client device.

2. The server computer system of claim 1, wherein:
the textual command comprises a textual command to fully redact the PII of the user, and
the set of instructions, which when executed by the one or more processors, causes the server computer system to automatically fully redact the PII from the generated reply message.

3. The server computer system of claim 1, wherein:
the textual command comprises a textual command to partially redact the PII of the user by having a specific number of characters/digits in the PII left intact, and
the set of instructions, which when executed by the one or more processors, causes the server computer system to partially redact the PII from the generated reply message.

4. The server computer system of claim 1, wherein the textual command selectively specifies particular types of PII to be redacted during the virtual chat communication session while allowing other types of PII to not be redacted.

5. The server computer system of claim 1, wherein the set of instructions, which when executed by the one or more processors, causes the server computer system to:
receive, from the client device contemporaneously within the virtual chat communication session, another textual command to set the modified user security settings as a default user security settings for future virtual chat communication sessions, and
set the modified user security settings as the default user security setting.

6. A computer program product comprising at least one non-transitory computer readable medium having with a set of instructions of computer-executable program code, which when executed by one or more processors of a server computer system, cause the server computer system to:
cause, during execution of a mobile application or desktop application associated with a financial institution by a client device of a user over a communication network, a visual display of a chat interface on the client device to facilitate a virtual chat communication session between the user and a virtual support agent of the financial institution;
receive, from the client device contemporaneously within the virtual chat communication session, a textual command to redact personally identifiable information (PII) of the user;
apply a neural network to parse the words in the textual command;
modify a user security setting to reflect redacting of PII visually displayed on the chat interface;
receive, from the client device contemporaneously within the virtual chat communication session, a user request for information;
generate, in response to the user request for information and contemporaneously within the virtual chat communication session, a reply message;
utilize a data structure to identify PII in the words of the generated reply message;
automatically redact the identified PII in the generated reply message; and
transmit, contemporaneously within the virtual chat communication session, the redacted reply message to the client device for visual display on the chat interface of the client device.

7. The computer program product of claim 6, wherein:
the textual command comprises a textual command to fully redact the PII of the user, and
the set of instructions, which when executed by the one or more processors, causes the server computer system to fully redact the PII from the reply message.

8. The computer program product of claim 6, wherein:
the textual command comprises a textual command to partially redact the PII of the user by having a specific number of characters/digits in the PII left intact, and
the set of instructions, which when executed by the one or more processors, causes the server computer system to partially redact the PII from the reply message.

9. The computer program product of claim 6, wherein the textual command selectively specifies particular types of PII to be redacted during the virtual chat communication session while allowing other types of PII to not be redacted.

10. The computer program product of claim 6, wherein the set of instructions, which when executed by the one or more processors, causes the server computer system to:
receive, from the client device contemporaneously within the virtual chat communication session, another textual command to set the modified security setting as a default user security setting for future virtual chat communication sessions, and
set the modified user security setting as the default user security setting.

11. A computer-implemented method, comprising:
causing, by one or more financial institution servers associated with a financial institution during execution of a mobile application or desktop application associated with the financial institution by a client device of a user over a communication network, a visual display of a chat interface on the client device to facilitate a virtual chat communication session between the user and a virtual support agent of the financial institution;
receiving, by the one or more financial institution servers from the client device contemporaneously within the virtual chat communication session, a textual command to redact personally identifiable information (PII) of the user;
applying, by the one or more financial institution servers, a neural network to parse the words in the textual command;
modifying, by the one or more financial institution servers, a user security setting to reflect redacting of PII visually displayed on the chat interface;
receiving, by the one or more financial institution servers from the client device contemporaneously within the virtual chat communication session, a user request for information;
generating, by the one or more financial institution servers in response to the user request for information and contemporaneously within the virtual chat communication session, a reply message;
utilizing, by the one or more financial institution servers, a data structure to identify which words in the generated reply message command contain PII;
automatically redacting, by the one or more financial institution servers, the identified PII in the generated reply message; and
transmitting, by the one or more financial institution servers contemporaneously within the virtual chat communication session, the redacted reply message to the client device for visual display on the chat interface of the client device.

12. The computer-implemented method of claim 11, wherein:
the textual command comprises a textual command to fully redact the PII of the user, and redacting the PII in the reply message comprises fully redacting the PII from the generated reply message.

13. The computer-implemented method of claim 11, wherein:
the textual command comprises a textual command to partially redact the PII of the user by having a specific number of characters/digits in the PII left intact, and
redacting the PII in the reply message comprises partially redacting the PII from the generated reply message.

14. The computer-implemented method of claim 11, further comprising:
receiving, from the client device by the one or more financial institution servers contemporaneously within the virtual chat communication session, another textual command to set the modified user security setting as a default user security setting for future virtual chat communication sessions, and
setting the modified user security setting as the default user security setting.

15. The computer-implemented method of claim 11, wherein the textual command selectively specifies particular types of PII to be redacted during the virtual chat communication session while allowing other types of PII to not be redacted.

* * * * *